United States Patent
Abraham et al.

(10) Patent No.: US 11,039,497 B2
(45) Date of Patent: Jun. 15, 2021

(54) USER PLANE BASED SMALL DATA SERVICE

(71) Applicant: QUALCOMM Incorporated, San Diego, CA (US)

(72) Inventors: Santosh Paul Abraham, San Diego, CA (US); Miguel Griot, La Jolla, CA (US); Sebastian Speicher, Wallisellen (CH); Haris Zisimopoulos, London (GB); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 16/127,684

(22) Filed: Sep. 11, 2018

(65) Prior Publication Data

US 2019/0090298 A1    Mar. 21, 2019

Related U.S. Application Data

(60) Provisional application No. 62/560,106, filed on Sep. 18, 2017.

(51) Int. Cl.
*H04W 76/27* (2018.01)
*H04W 4/70* (2018.01)
(Continued)

(52) U.S. Cl.
CPC ......... *H04W 76/27* (2018.02); *H04L 63/0428* (2013.01); *H04L 67/12* (2013.01);
(Continued)

(58) Field of Classification Search
None
See application file for complete search history.

(56) References Cited

U.S. PATENT DOCUMENTS

| 2013/0308564 | A1* | 11/2013 | Jain | ...................... | H04L 5/0037 |
| | | | | | 370/329 |
| 2015/0373733 | A1* | 12/2015 | Bangolae | .......... | H04W 72/0406 |
| | | | | | 370/329 |

(Continued)

OTHER PUBLICATIONS

3rd Generation Partnership Project; Technical Specification Group Services and System Aspects; Study on Architecture for Next Generation System (Release 14) (Year: 2016).*

(Continued)

*Primary Examiner* — Sithu Ko
*Assistant Examiner* — Emmanuel K Maglo
(74) *Attorney, Agent, or Firm* — Nerrie M. Zohn

(57) ABSTRACT

A core network receives data from at least one of an AF, a DN, or a UE. A UPF having small data capability processes the data for transport with a low overhead and without initiating a bearer set up protocol. The data may be transported between the UE and the UPF as an RRC payload over a NAS protocol. The data may be received from an AF or DN external to the core network and may be processed to transport the data to the UE based as an RRC payload. The data may be received as uplink data from a UE, e.g., in an RRC payload. The UPF may process the RRC payload to obtain the data and may transport the data to the AF or DN. The UPF may perform IP header compression, data encryption, and/or buffering of data for a UE in an idle mode.

29 Claims, 20 Drawing Sheets

(51) Int. Cl.
| | |
|---|---|
| *H04W 28/02* | (2009.01) |
| *H04L 29/08* | (2006.01) |
| *H04W 12/033* | (2021.01) |
| *H04W 76/12* | (2018.01) |
| *H04W 76/11* | (2018.01) |
| *H04L 29/06* | (2006.01) |
| *H04W 28/06* | (2009.01) |

(52) U.S. Cl.
 CPC .......... *H04W 4/70* (2018.02); *H04W 12/033* (2021.01); *H04W 28/0215* (2013.01); *H04W 28/06* (2013.01); *H04W 76/11* (2018.02); *H04W 76/12* (2018.02)

(56) References Cited

U.S. PATENT DOCUMENTS

| | | | | |
|---|---|---|---|---|
| 2016/0113057 | A1* | 4/2016 | Haneji | H04W 76/34 370/328 |
| 2017/0251516 | A1* | 8/2017 | Bangolae | H04W 76/27 |
| 2017/0311278 | A1* | 10/2017 | Adjakple | H04W 68/005 |
| 2018/0097657 | A1* | 4/2018 | Dao | H04L 41/0893 |
| 2018/0192289 | A1* | 7/2018 | Dao | H04W 12/06 |
| 2018/0198867 | A1* | 7/2018 | Dao | H04W 76/34 |
| 2018/0199240 | A1* | 7/2018 | Dao | H04W 76/10 |
| 2018/0270791 | A1* | 9/2018 | Park | H04W 68/04 |
| 2018/0270792 | A1* | 9/2018 | Park | H04W 76/28 |
| 2018/0270894 | A1* | 9/2018 | Park | H04W 36/0055 |
| 2019/0058508 | A1* | 2/2019 | Yiu | H04B 7/0857 |
| 2019/0075552 | A1* | 3/2019 | Yu | H04W 72/04 |
| 2019/0124502 | A1 | 4/2019 | Zhang et al. | |
| 2019/0200178 | A1* | 6/2019 | Sudarsan | H04W 52/0229 |
| 2020/0014762 | A1* | 1/2020 | Li | H04L 65/1066 |
| 2020/0084677 | A1* | 3/2020 | Yiu | H04W 76/27 |
| 2020/0120475 | A1* | 4/2020 | Gupta | H04W 60/00 |
| 2020/0178321 | A1 | 6/2020 | Liu et al. | |

OTHER PUBLICATIONS

3rd Generation Partnership Project; Technical Specification Group Radio Access Network; Study on New Radio Access Network; Study on New Radio Access Technology; Radio Interface Protocol Aspects (Release 14), 3GPP Standard; Technical Report; 3GPP TR 38.804, 3rd Generation Partnership Project (3GPP), Mobile Competence centre; 650, Route Des Lucioles; F-06921 Sophia-Antipolis Cedex; France, vol. RAN WG2, No. V14.0.0, Mar. 24, 2017, pp. 1-57, XP051297619, [retrieved on Mar. 24, 2017].

3rd Generation Partnership Project; Technical Specification Group Services and System Aspects; General Packet Radio Service (GPRS) Enhancements for Evolved Universal Terrestrial Radio Access Network (E-UTRAN) access (Release 15), 3GPP TS 23.401, 3rd Generation Partnership Project (3GPP), Mobile Competence Centre; 650, Route Des Lucioles; F-06921 Sophia-Antipolis Cedex; France, vol. SA WG2, No. V15.0.0, Jun. 12, 2017, pp. 1-386, XP051298391, [retrieved on Jun. 12, 2017].

3rd Generation Partnership Project; Technical Specification Group Services and System Aspects; Study on Architecture for Next Generation System (Release 14), 3GPP Standard; 3GPP TR 23.799, 3rd Generation Partnership Project (3GPP), Mobile Competence Centre; 650, Route Des Lucioles; F-06921 Sophia-Antipolis Cedex; France, vol. SA WG2, No. V14.0.0, Dec. 16, 2016, pp. 1-522, XP051230010, [retrieved on Dec. 16, 2016].

International Search Report and Written Opinion—PCT/US2018/050668—ISA/EPO—dated Nov. 30, 2018.

Qualcomm Inc: "5G IoT Next Steps in 3GPP," 3GPP Draft; S2-173043_CIOT_NEXT_STEPS-R7, 3rd Generation Partnership Project (3GPP), Mobile Competence Centre; 650, Route Des Lucioles; F-06921 Sophia-Antipolis Cedex; France, vol. SA WG2, No. Hangzhou; May 15, 2017-May 19, 2017, May 14, 2017, XP051281552, 26 pages, Retrieved from the Internet: URL: http://www.3gpp.org/ftp/Meetings_3GPP_SYNC/SA2/Docs/ [retrieved on May 14, 2017].

ZTE: "Update for Solution 5: Small Data Fast Path Communication," 3GPP Draft; S2-186602 Update for Solution 5 SDFP, 3rd Generation Partnership Project (3GPP), Mobile Competence Centre; 650, Route Des Lucioles; F-06921, Sophia-Antipolis Cedex; France, vol. SA WG2, No. Vilnius, Lithuania; Jul. 2, 2018-Jul. 6, 2018, Jul. 1, 2018, XP051469750, 66 pages, Retrieved from the Internet: URL: http://www.3gpp.org/ftp/Meetings%5F3GPP%5FSYNC/SA2/Docs [retrieved on Jul. 1, 2018].

* cited by examiner

USER PLANE BASED SMALL DATA SERVICE

CROSS-REFERENCE TO RELATED APPLICATION

This application claims the benefit of U.S. Provisional Application Ser. No. 62/560,106, entitled "User Plane Based Small Data Service" and filed on Sep. 18, 2017, the entire contents which are expressly incorporated by reference herein in their entirety.

BACKGROUND

Technical Field

The present disclosure relates generally to communication systems, and more particularly, to data delivery over a core network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A focus of the traditional LTE design relates to the improvement of spectral efficiency, ubiquitous coverage, and enhanced quality of service (QoS) support, etc. Current LTE system down link (DL) and uplink (UL) link budgets may be designed for coverage of high end devices, such as state-of-the-art smartphones and tablets. However, it may be desirable to support low cost low rate devices as well. Such communication may involve a reduction in a maximum bandwidth, e.g., a narrowband bandwidth, use of a single receive radio frequency (RF) chain, a reduction in peak rate, a reduction in transmit power, the performance of half duplex operation, etc. One example of such narrowband wireless communication is Narrowband-Internet of Things (NB-IoT), which may be limited to a single RB of system bandwidth, e.g., 180 kHz. Another example of narrowband wireless communication is enhanced machine type communication (eMTC), which may be limited to six RBs of system bandwidth.

Narrowband wireless communication involves unique challenges due to the limited frequency dimension of the narrow band. Additionally, low power operation may be very important for such low complexity devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In Cellular Internet of Things (CIoT) small amounts of data may need to be transferred via a core network to a User Equipment (UE). This may include infrequent small data transfers and/or frequent small data transfers. A significant amount of overhead may be required in order to communicate small data between a user equipment and an Application Function (AF), for example.

In one example, the small data may be a 50 byte packet. If the 50 byte packet is handled in the same manner as larger data packets, then a significant amount of communication must be performed to establish a connection, open radio bearers, establish security, etc. before the small data may be transmitted. The amount of communication required in preparation to send the data to a UE may include hundreds of bytes of data, whereas the data itself is only 50 bytes. Thus, the overhead requirement is larger than the small data and places a significant burden on both the core network and the UE. Furthermore, an AF or a UE may send such small data messages in a periodic manner, e.g., once every hour. The overhead requirement grows with the periodic communication of the small data. As well, the network may support a large number of devices that communicate small data. The number of supported devices amplifies the overhead burden on the network.

Aspects presented herein provide for communication of small data with the UE via a user plane of the core network. The aspects presented herein may reduce connection set up requirements for the UE and the Radio Access Network (RAN) in order to communicate such small data to the UE by transporting the data from a User Plane Function (UPF), which may be referred to herein as a Small Data Capable User Plane Function (SDC-UPF). The data may be transported from the UPF to the UE, e.g., as a payload in an RRC message. Similarly, the UE may transmit uplink small data in an RRC message. At a core network, data ingress for Non-IP Data Delivery (NIDD) may use an interface directly from an Application Function (AF) to the SDC-UPF. In one example, the ingress for NIDD may comprise a T8 reference point. The SDC-UPF may terminate a the interface by which an AF introduces data into the core network. The SDC-UPF may be configured to store and forward small data towards a UE. For example, the SDC-UPF may be configured to buffer small data while a UE is in an idle mode and to forward the small data toward the UE when the UE is in an active mode, e.g., an RRC connected mode. The SDC-UPF may be configured to perform Internet Protocol (IP) compression, e.g., IP header compression, for small data IP streams. The SDC-UPF may also encrypt data with UPF specific encryption keys. An enhanced N3 interface may be configured to carry encrypted small data Protocol Data Units (PDUs). The N3 may be available even when no UE Access Stratum (AS) context is available at the RAN.

In an aspect of the disclosure, a method, a computer-readable medium, and an apparatus are provided for wireless communication at a core network. The apparatus receives data from at least one of an AF, a Data Network (DN), and a UE and processes the data at a UPF, wherein the data is below a size threshold, and wherein the UPF is configured to allow small data below the size threshold to be communicated between the UPF and the user equipment without initiating a bearer set up protocol. For example, when the data is received from the AF or the DN, the apparatus may transport the data from the UPF to the UE as an RRC payload. When the data is received in an RRC payload from the UE, the apparatus may transport the data from the UPF to the AF of the DN.

In another aspect of the disclosure, a method, a computer-readable medium, and an apparatus are provided for wireless communication at a UE. The apparatus establishes a Protocol Data Unit (PDU) session with a Network Exposure Function (NEF) for communication of small data below a threshold size. The apparatus then communicates the data with at least one of an AF or a DN, wherein the data is communicated with the UPF for transport with a low overhead as an RRC payload. For example, the UE apparatus may receive the data from the AF or the DN based on the RRC payload received from a RAN. The apparatus may transmit the data to the UPF as the RRC payload for transport to the AF or the DN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
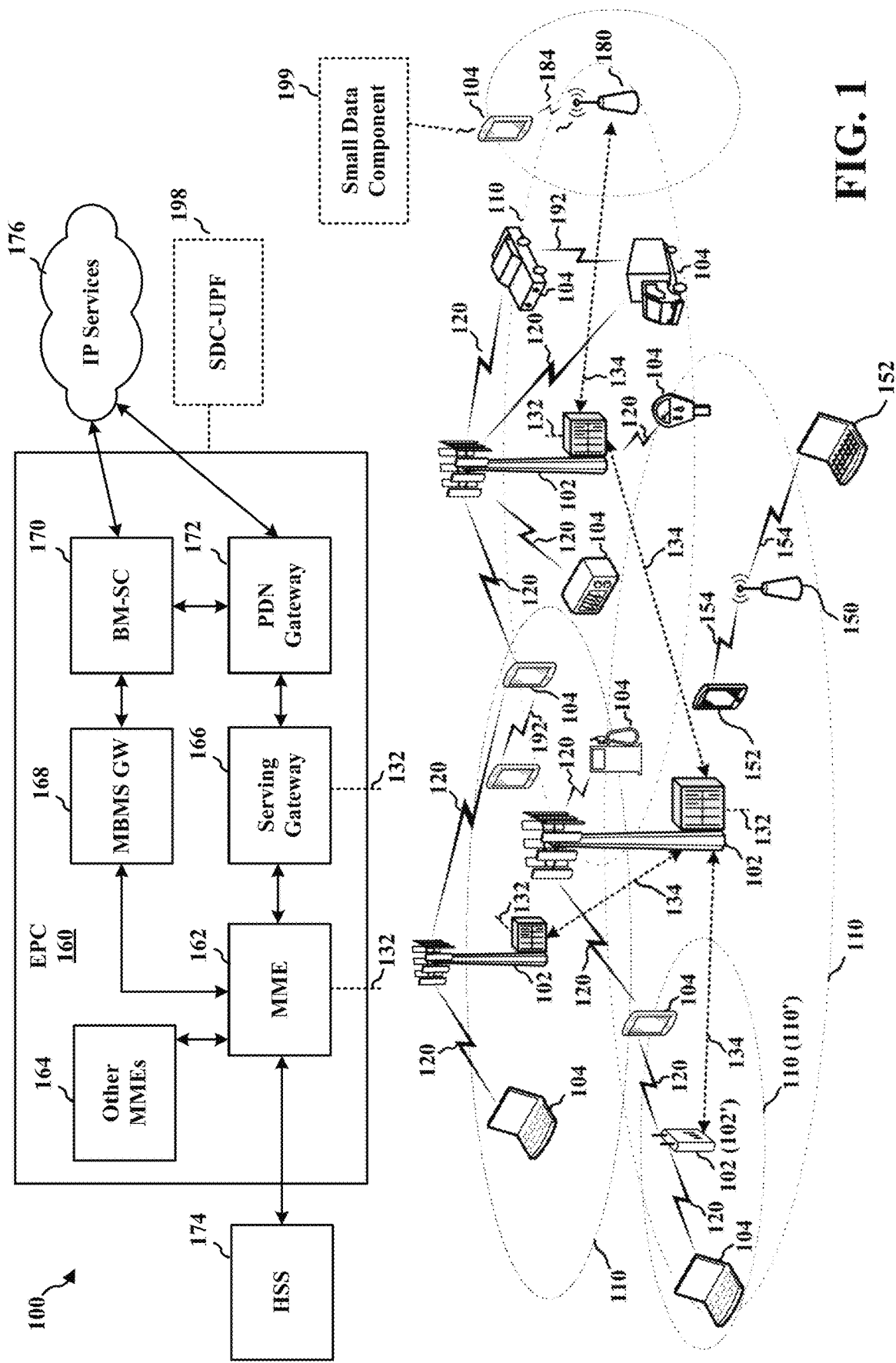
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a core network, e.g., network 160, may include an UPF capable of processing and communicating small data between UE 104 and an AF or DN external to the network (e.g., SDC-UPF 198), such as described in connection with FIGS. 4-20. In other aspects, UE 104 may comprise a small data component 199 configured to communicate small data with an AF or DN as an RRC payload, as described in connection with FIGS. 4-20.

Figure 2:
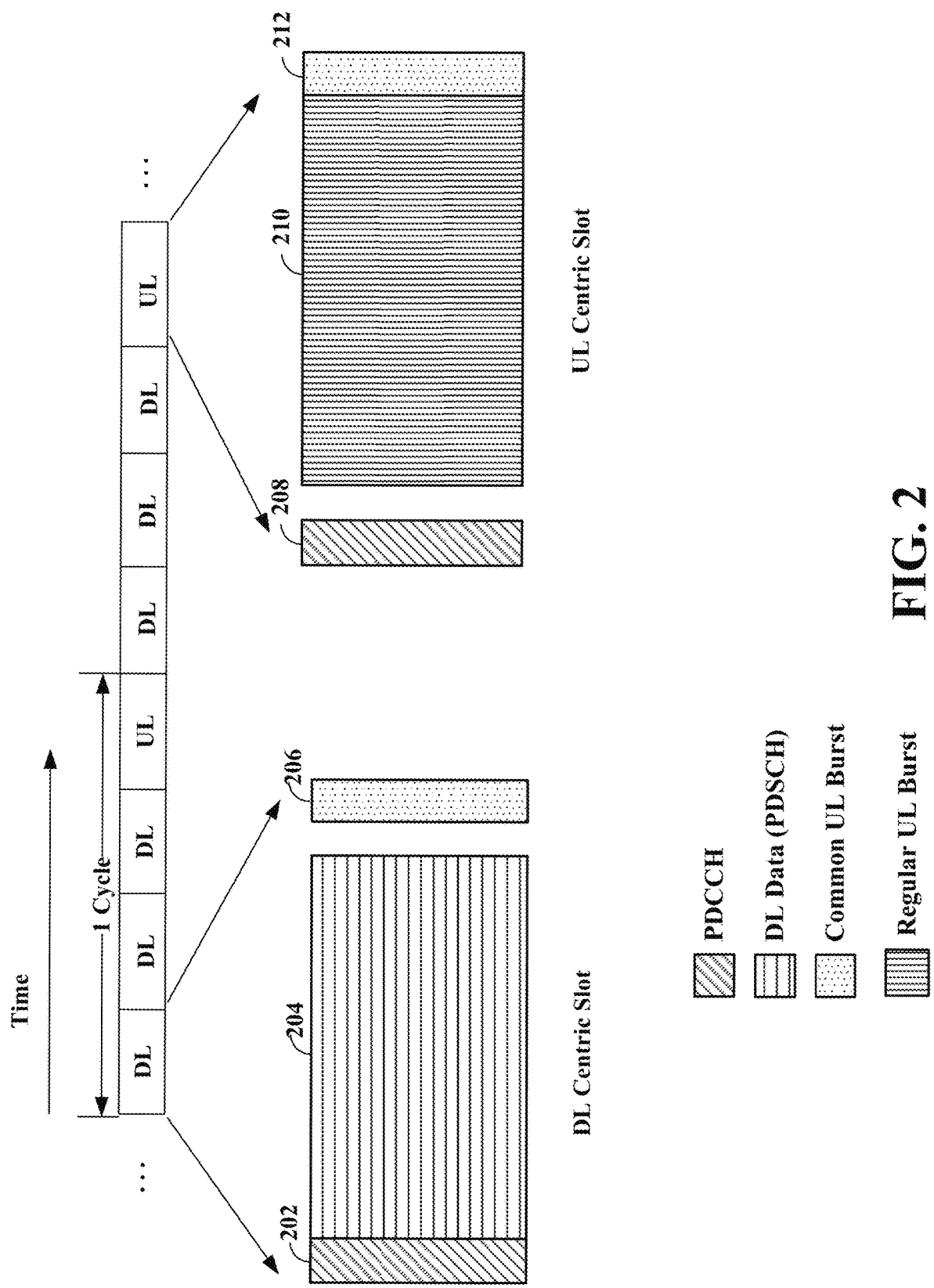
FIG. 2 illustrates an example slot structure for UL centric slots and DL centric slots.

FIG. 2 illustrates an example slot structure comprising DL centric slots and UL centric slots. In NR, a slot may have a duration of 0.5 ms, 0.25 ms, etc., and each slot may have 7 or 14 symbols. A resource grid may be used to represent the time slots, each time slot including one or more time concurrent resource blocks (RBs) (also referred to as physical RBs (PRBs)). The resource blocks for the resource grid may be further divided into multiple resource elements (REs). The number of bits carried by each RE depends on the modulation scheme.

A slot may be DL only or UL only, and may also be DL centric or UL centric. FIG. 2 illustrates an example DL centric slot. The DL centric slot may comprise a DL control region 202, e.g., in which in which physical downlink control channel (PDCCH) is transmitted. Some of the REs of the DL centric slot may carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS).

A physical broadcast channel (PBCH) may carry a master information block (MIB). The MIB provides a number of RBs in the DL system bandwidth, a PHICH configuration, and a system frame number (SFN). The DL centric slot may comprise a DL data region 204, e.g., in which a physical downlink shared channel (PDSCH) carries user data, broadcast system information not transmitted through the PBCH such as system information blocks (SIBs), and paging messages.

The DL centric slot may also comprise a common UL burst region (ULCB) 206 in which UEs may send UL control channel information or other time sensitive or otherwise critical UL transmissions.

For example, the UE may additionally transmit sounding reference signals (SRS). The SRS may be used by an eNB for channel quality estimation to enable frequency-dependent scheduling on the UL. A physical random access channel (PRACH) may be included within one or more slots within a slot structure based on the PRACH configuration. The PRACH allows the UE to perform initial system access and achieve UL synchronization. Additionally, the common UL burst 206 may comprise a physical uplink control channel (PUCCH) that carries uplink control information (UCI), such as scheduling requests, a channel quality indicator (CQI), a precoding matrix indicator (PMI), a rank indicator (RI), and HARQ ACK/NACK feedback.

Similar to the DL centric slot, the UL centric slot may comprise a DL control region 208, e.g., for PDCCH transmissions. The DL control region 202, 208 may comprise a limited number of symbols at the beginning of a slot. The UL centric slot may comprise an UL data region 210, e.g., for the transmission of a Physical Uplink Shared Channel (PUSCH) that carries data, and may additionally be used to carry a buffer status report (BSR), a power headroom report (PHR), and/or UCI. The UL data region 210 may be referred to as a UL regular burst (ULRB) region. The UL centric slot may also comprise a common UL burst region (ULCB) 212 similar to that of the DL based slot 206.

The UL centric slot may comprise a guard band between the UL data region 210 and the ULCB 212. For example, the guard band may be based on the eNB's capabilities and used to reduce interference when the UL data region 210 and the ULCB have different numerologies (symbol periods, slot lengths, etc.). The DL control region 202, 208 may comprise a limited number of symbols at the beginning of a slot and the ULCB region may comprise one or two symbols at the end of the slot, for both the DL centric and the UL centric slots. Resource management of PUSCH or PUCCH transmissions in the ULRB may be similar to that PUSCH or PUCCH for LTE. However, where LTE may be primarily driven by a SC-FDM waveform, NR may be based on an SC-FDM or OFDM waveform in the ULRB 210.

Figure 3:
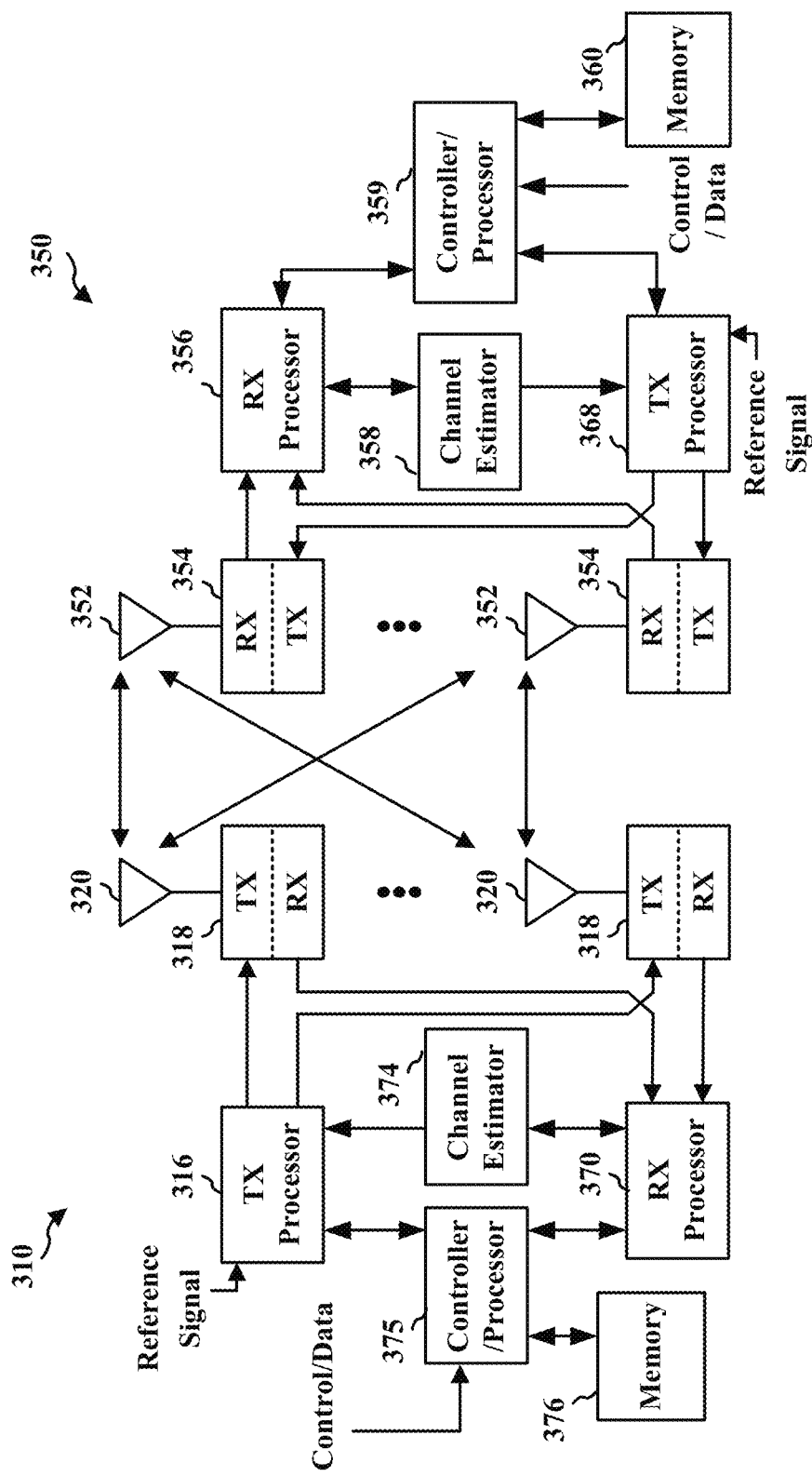
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

It may be desirable to support low cost low rate devices. Such communication may involve a reduction in a maximum bandwidth, e.g., a narrowband bandwidth, use of a single receive radio frequency (RF) chain, a reduction in peak rate, a reduction in transmit power, the performance of half duplex operation, etc. One example of such narrowband wireless communication is Narrowband-Internet of Things (NB-IoT), which may be limited to a single RB of system bandwidth, e.g., 180 kHz. Another example of narrowband wireless communication is enhanced machine type communication (eMTC), which may be limited to six RBs of system bandwidth.

Narrowband wireless communication involves unique challenges due to the limited frequency dimension of the narrow band. Additionally, low power operation may be very important for such low complexity devices.

In Cellular Internet of Things (CIoT) small amounts of data may need to be transferred via a core network to a user equipment. This may include infrequent small data transfers and/or frequent small data transfers. Such data may comprise user data in contrast to control or measurement communication. Small data may comprise amounts of data having a size below a threshold. Small data may comprise, e.g., a data stream having relatively infrequent and even short lived sporadic burst transmissions of data for which the overhead of a conventional link set up protocol would be large relative to the amount of data conveyed. In one example, small data may have a size below 100 bytes and/or may have a data rate below 100 kbps. For example, an electricity meter or a water meter may monitor and report data about electricity usage or water usage. The meters may periodically transmit small amounts of data to a network, e.g., reporting the monitored electrical or water information. In another example, the small data may comprise information from collected at a sensor. The data comprises user data rather than control information or control measurements from a UE.

In one example, the small data may be a 50 byte packet. If the 50 byte packet is handled the same as larger data packets, then a significant amount of communication must be performed to establish a connection, open radio bearers, establish security, etc. prior to transmitting the data. The communication required in preparation to send the data to a UE may include hundreds of bytes of data, whereas the data itself is only 50 bytes. The overhead requirement is larger than the small data and places a significant burden on both the core network and the UE. An AF or a UE may send small data messages in a periodic manner, e.g., once every hour. The overhead requirement grows with the periodic communication of the small data. Furthermore, the network may support a large number of devices that communicate small data. The overhead burden on the network is amplified.

Both a UE and a RAN may benefit from leveraging an idle mode as much as possible. Additional benefits may be derived through a reduction in connection set up requirements for such small data transfers. It may also be helpful to minimize, or otherwise reduce, context storage requirements at RAN nodes.

At a core network, data ingress for Non-IP Data Delivery (NIDD) may use a reference point. In one example, the reference point for NIDD may comprise a T8 reference point. Such a reference point may reduce impact to service due to inter-RAT or Inter-CN mobility by the UE.

In order to provide such benefits, e.g., to the UE and the RAN, small data frames may be carried over a user plane. As described above, small amounts of data may be transmitted in a periodic or infrequent manner. As one example, a sensor may transmit measurement data in an infrequent or periodic manner. Small data may comprise data that meets a size threshold, such as being below a size threshold. In one example, the size threshold may be, e.g., 64 octet. Thus, data that is less than 64 octet may be carried over the user plane, as presented herein, in a manner that reduces the overhead burden to communicate the data. In another example, as described above, a threshold for small data may comprise 100 bytes and/or a data rate of 100 kbps. In this example, small data having a size below 100 bytes and/or having a data rate below 100 kbps may be communicated over the user plane, as presented herein. If the data is larger than the size threshold for small data, e.g., the data may be communicated in another manner, e.g., using the normal signaling overhead. The examples of 64 octet, 100 bytes, and/or 100 kbps are merely examples of a size threshold for small data. The size threshold for data to be transported as small data over the user plane, as presented herein, may also be set at a different size.

Architectural changes may be made to configure a UPF and other user plane entities to support small data transport. For example, a UPF may be enhanced with small data functionality and may incorporate a termination for NIDD transport. In one example, the termination may comprise a T8 termination. However, in other examples different protocols than T8 may be used for the NIDD termination a the UPF. The UPF may also incorporate encryption so that a RAN context is not required to transmit the data to the UE.

Figure 4:
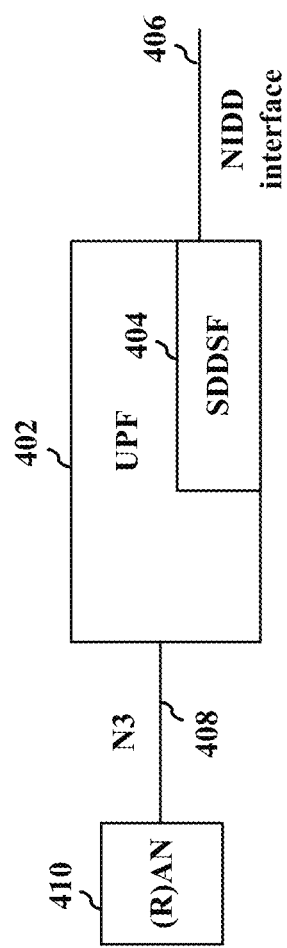
FIG. 4 is a diagram illustrating an SDC-UPF.

FIG. 4 illustrates an enhanced UPF 402 configured to include a small data delivery service function (SDDSF) 404. The Small Data Capable UPF (SDC-UPF) enables small data transfer with low overhead, e.g., as an RRC payload. The SDDSF may provide enhanced capabilities to the UPF, e.g., including terminating an NIDD interface 406 for small data. The SDDSF may enable the UPF to store and forward small data towards a UE. For example, the UPF may be configured to buffer small data while a UE is in an idle mode and to forward the small data toward the UE when the UE is awake. For example, of the three states RRC connected, RRC idle, and RRC inactive, the states RRC idle and RRC inactive may be states in which the UE is not considered awake. The UE may be considered awake when the UE is in an RRC connected state. The SDDSF may be configured to perform IP compression, e.g., IP header compression, for small data IP streams. The SDDSF may also encrypt data, e.g., with UPF-UE specific encryption keys. These encryption keys may be provided by an AF, e.g. rather than from a UE network service subscription. An enhanced N3 interface 408 may also be configured to carry encrypted data PDUs between the RAN 410.

Figure 5:
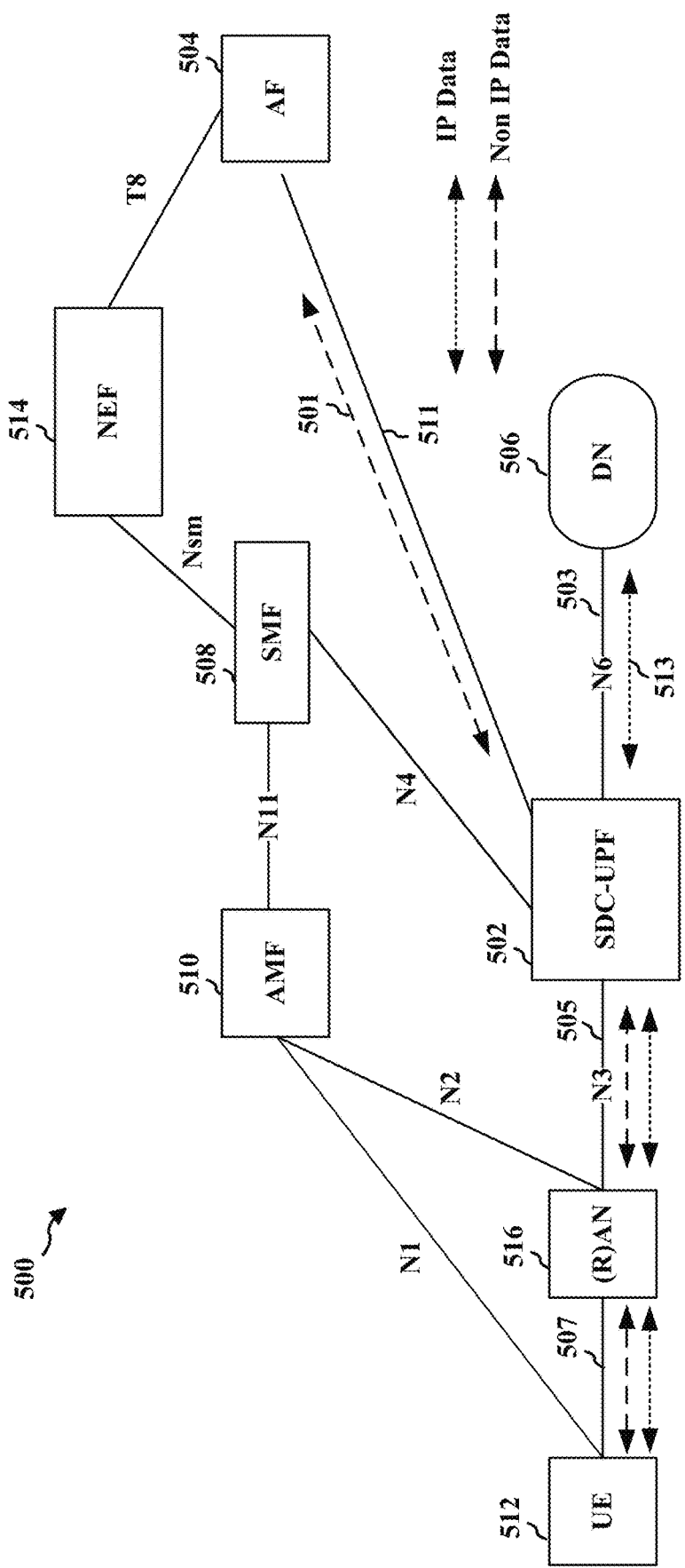
FIG. 5 is an example network architecture having a data delivery path comprising an SDC-UPF.
Figure 8:
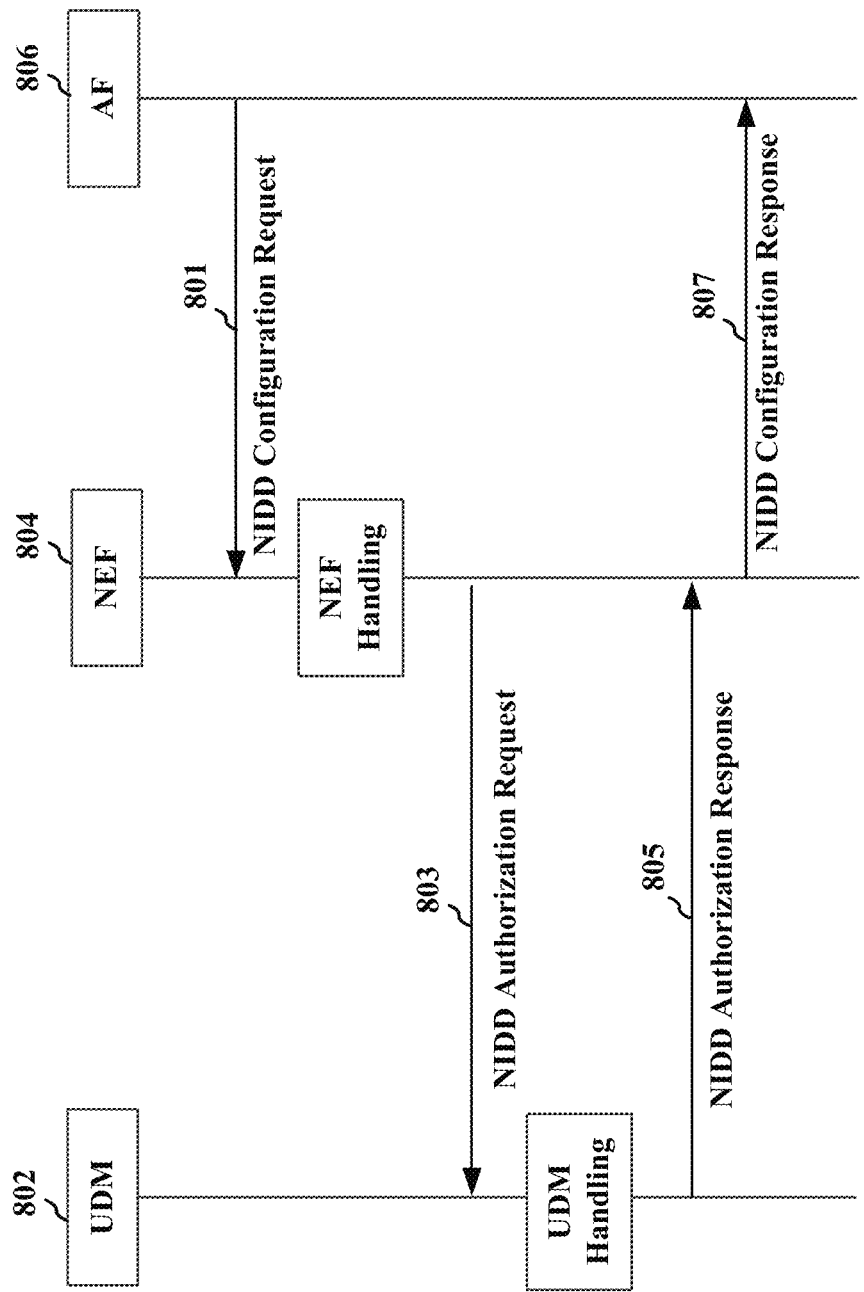
FIG. 8 illustrates an example communication flow for NIDD through an SDC-UPF.
Figure 9:
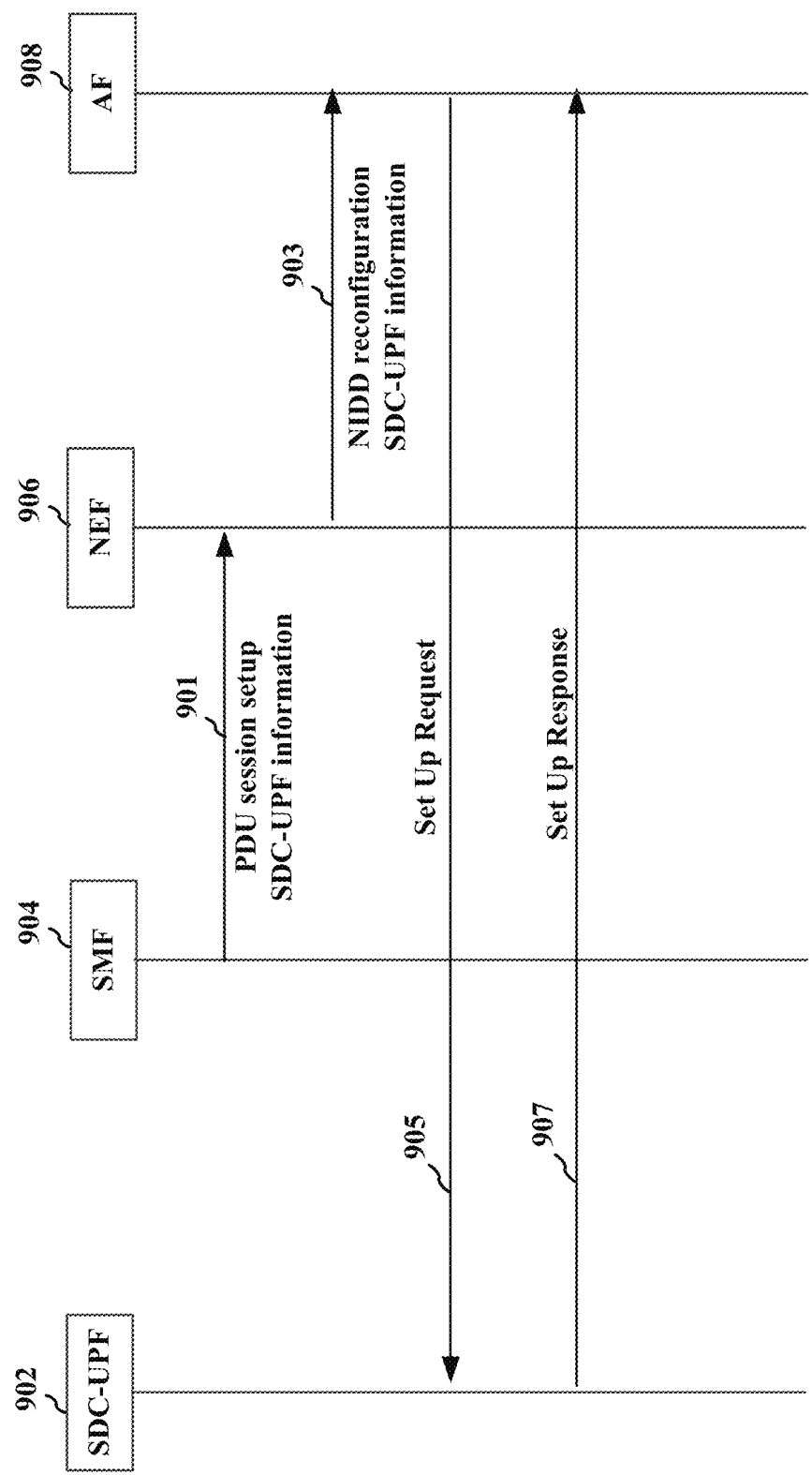
FIG. 9 illustrates an example communication flow for T8 set up with an SDC-UPF.
Figure 10:
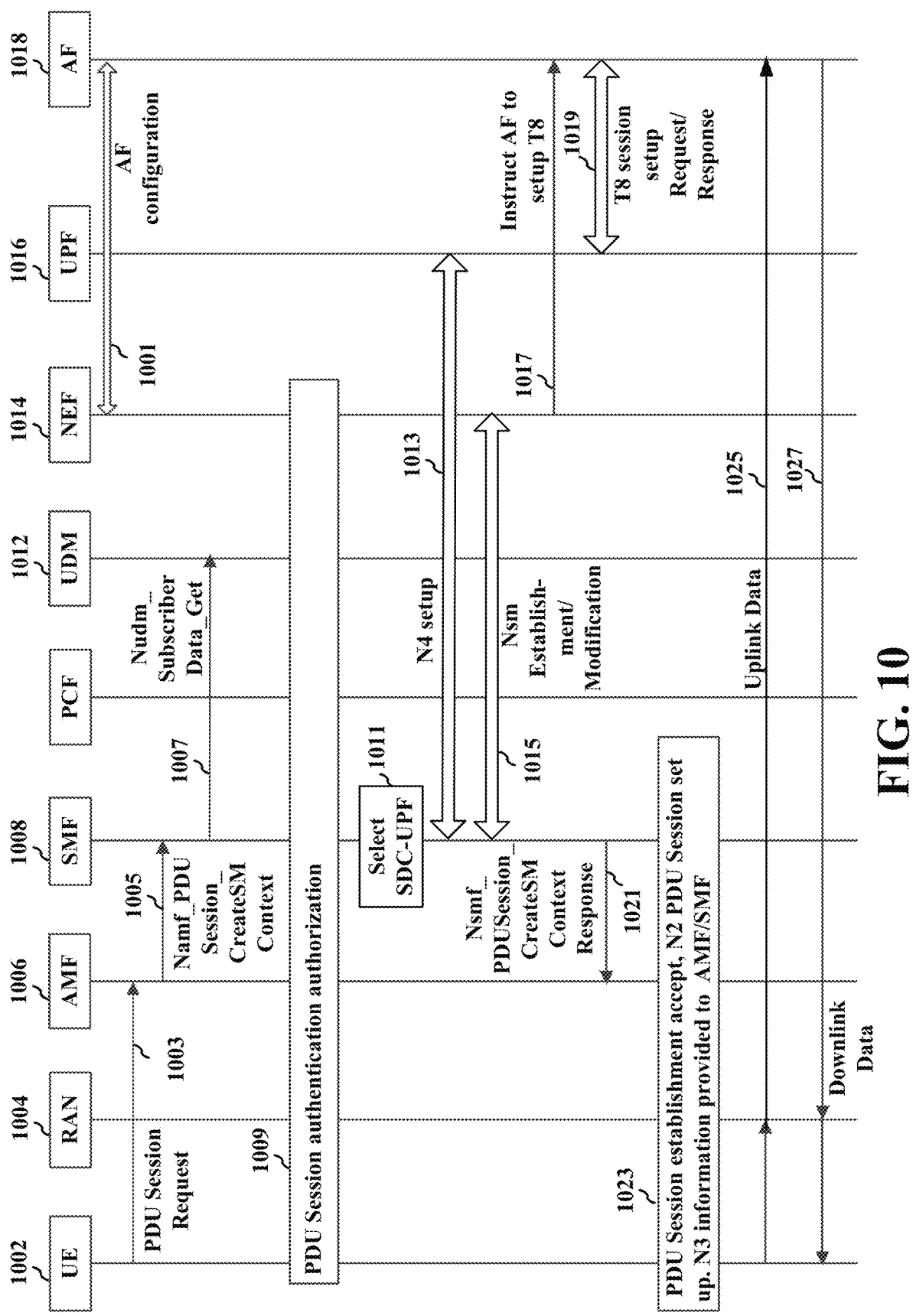
FIG. 10 illustrates an example communication flow for NIDD PDU connection setup

FIG. 5 illustrates an example network architecture 500 having a data delivery path that comprises an SDC-UPF 502. The network architecture 500 may comprise a 5G network having a control plane and a user plane. As illustrated in FIG. 5, Mobile Terminated (MT) NIDD data 501 enters the core network, e.g., from an AF 504 external to the network, through an interface 511 that terminates at the SDC-UPF 502 (e.g., SDC-UPF 402). As one example, the interface 511 may use a T8 protocol, although other protocols may also be used to provide the data directly from the AF to the SDC-UPF. Thus, SDC-UPF 502 provides an ingress point for data 501 directly from the AF 504. Although only a single AF 504 is illustrated, any number of AFs may transport data to various user equipment 512 via the core network. An example set up procedure linking the AF 504 to an SDC-UPF 502 is illustrated in FIGS. 8-10. Mobile Terminated (MT) IP Data Delivery (IPDD) 513 may also enter the core network via a Data Network (DN) 506, e.g., via an N6 interface 503. The UPF 502 that receives the IP data 513 or Non-IP data 501 may process the data for low overhead transport to the UE 512 without initiating a bearer set up protocol. The UPF 502 may forward the processed data to the RAN 516, e.g., via an enhanced N3 interface 505. The processed data, whether received from AF 504 or DN 506, may be transported from the UPF to the UE 512 as an RRC payload. The data may be transmitted in the RRC payload from RAN 516 to the UE 512. IP compression, e.g., IP header compression, may be performed at the SDC-UPF 502. FIG. 5 also illustrates interfaces with the Core Access and Mobility Management Function (AMF) 510, Network Exposure Function (NEF) 514, and the SFM 508.

The network architecture of FIG. 5 provides a number of benefits. The architecture enables UPF functions, such as rate control, to be leveraged for CIoT data delivery. As well, this architecture enables data delivery without requiring control plane transmissions. This avoids overloads on the control plane associated with small data delivery.

Although this example has been described for data received from an AF or DN and transmitted to a UE, the SDC-UPF may similarly receive small data from UE 512, e.g., as an RRC payload. FIG. 10 illustrates an example communication flow showing both uplink and downlink small data transmissions. The SDC-UPF 502 may process the RRC payload to obtain the data and to provide the data as non-IP data 501 to the AF 504 or as IP data 513 to the DN 506. In this example, the SDC-UPF may perform IP header decompression.

Figure 6:
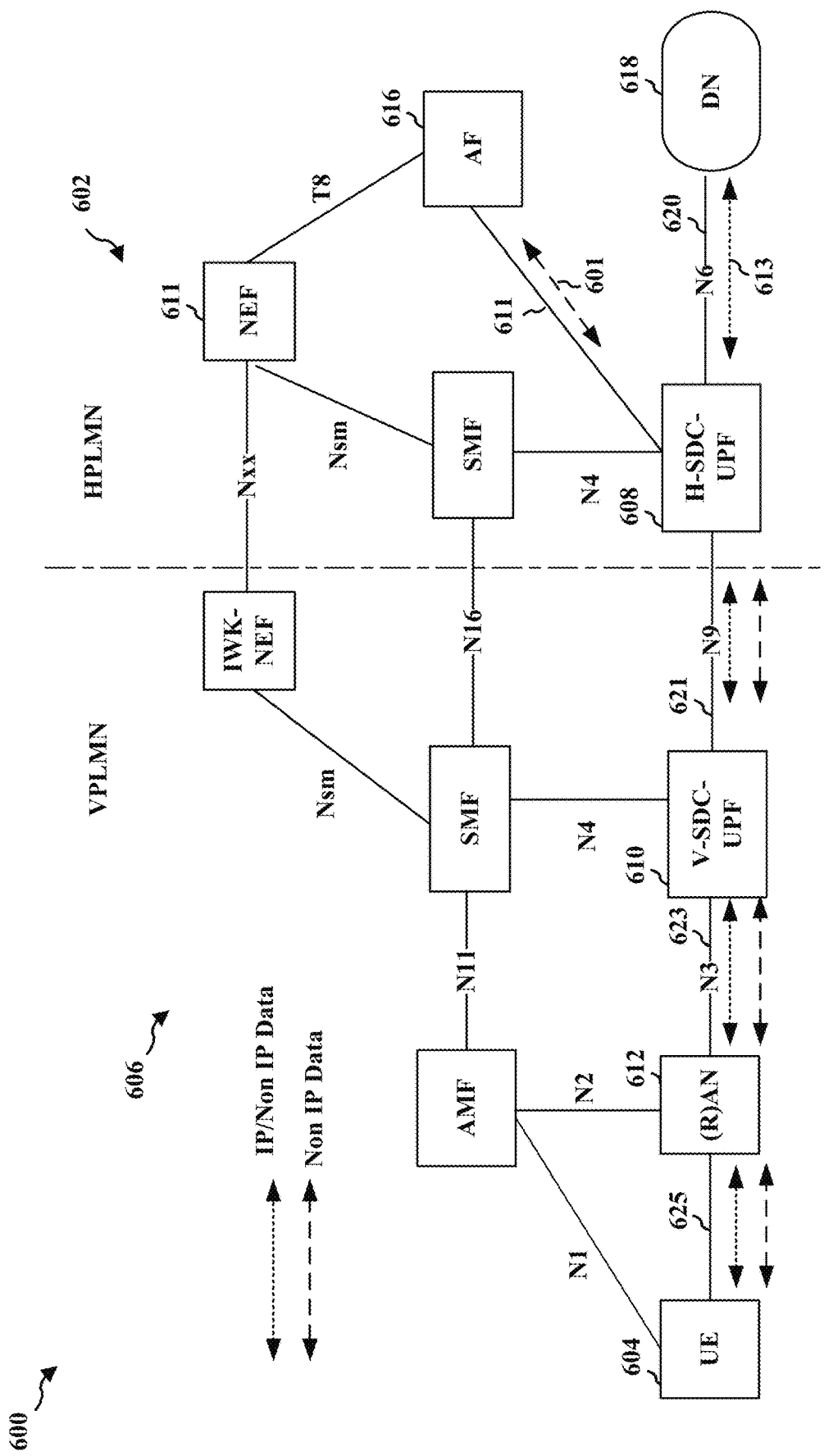
FIG. 6 illustrates an example roaming network architecture having a data delivery path comprising an SDC-UPF.

In FIG. 5, the architecture illustrates data transport by a home UPF. FIG. 6 illustrates an example 600 of a roaming architecture having a Home Public Land Mobile Network (HPLMN) 602 for a UE 604 that is located within a Visited Public Land Mobile Network (VPLMN) 606. In the HPLMN, a Home SDC-UPF (H-SDC-UPF) 608 may terminate an interface 611 for data 601 directly from AF 616, similar to interface 513 between AF 504 and SDC-UPF 502 in FIG. 5. As one example, the interface 611 may comprise a T8 protocol, although other protocols may also be used to provide data directly from AF 616 to H-SDC-UPF 608. Similarly, H-SDC-UPF 608 may perform IP header compression for IP data 613 received over interface 620 from DN 618. The H-SDC-UPF 608 may process and store data, whether non-IP data 601 or IP data 613. Then, H-SDC-UPF 608 forwards the processed data to Visited-SDC-UPF (V-UPF) 610 over interface 621. The interface between the H-SDC-UPF and the V-UPF 610 may comprise an N9 interface. Thus, the V-UPF 610 may be configured with minimal additional functionality for CIoT. For example, the V-UPF might not have at least some of the additional functionality of an SDC-UPF. The V-UPF 610 may select a H-SDC-UPF. The V-UPF may receive data processed by the H-SDC-UPF and add it to an RRC payload that is forwarded over an interface 623, e.g., N3 interface, to the RAN 612 for transport to UE 604, e.g., over interface 625. IP data may be sent to H-SDC-UPF 608 and forwarded to the V-UPF 610 over an N9 interface 621, e.g., after header compression. V-UPF 610 may perform an encryption and integrity check.

In another example, the V-UPF 610 may comprise a V-SDC-UPF and may perform the IP header compression in addition to encryption and integrity check. The V-SDC-UPF may also store small data for UEs in idle mode and forward the small data to the RAN 612 when the UE is awake, e.g., in an active mode.

Figure 7:
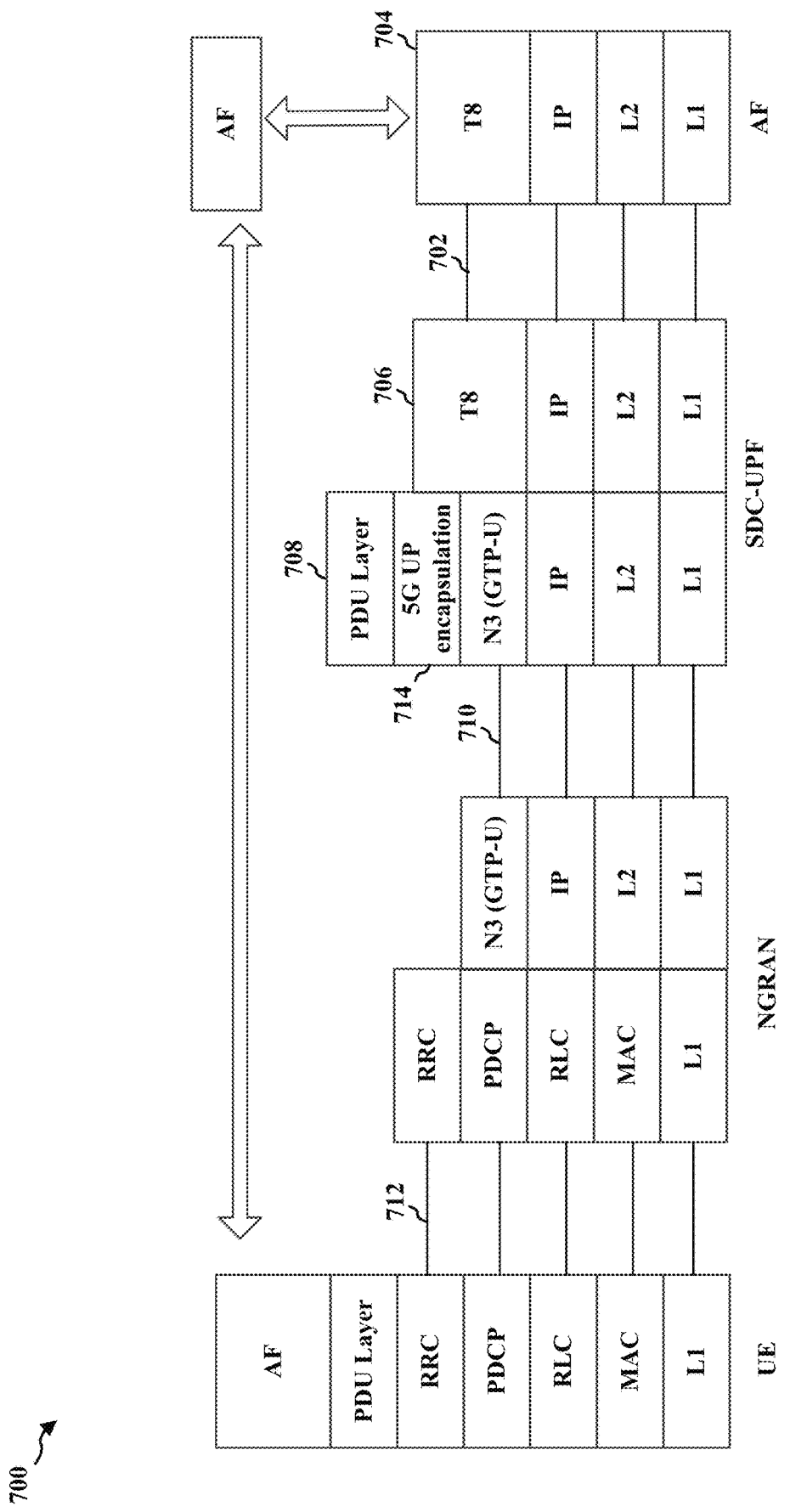
FIG. 7 illustrates an example Non-Internet Protocol Data Delivery (NIDD) protocol stack for data delivery through an SDC-UPF.

FIG. 7 illustrates an NIDD protocol stack 700 for transporting NIDD through SDC-UPF (e.g., SDC-UPF 402, 502, 608). Data frames may be delivered to the SDC-UPF using an interface directly from AF. The interface may use a T8 protocol, for example. Thus, in FIG. 7, the interface 702 is illustrated as being provided between T8 704 of AF and T8 706 of SDC-UPF. In other examples, different protocols may be used for the interface between the AF and the SDC-UPF. A new PDU layer 708 for CIoT at the SDC-UPF may perform encryption and addition of integrity check for the data frames. The new PDU layer 708 may also add a UE identifier for the data frames. The SDC-UPF may package the data frames as an RRC payload, e.g., via UP encapsulation layer 714, that is forwarded via N3 interface 710 from the SDC-UPF to the RAN. The data may then be forwarded as the RRC payload over interface 712 to the UE via the RAN. For uplink data frames, the data may be included in RRC messages received at the RAN from the UE, e.g., over interface 712. A UPF identifier (UPF-ID) may be included in the frame. The RAN may then forward the frame to the SDC-UPF, e.g., over the N3 interface 710, based on the UPF-ID. For downlink frames, a paging message may indicate to the UE that CIoT is present. The data may then be delivered to the UE as a payload in an RRC message.

FIG. 8 illustrates an example of aspects to enable NIDD to be provided from an AF 806 to a UE through SDC-UPF (e.g., SDC-UPF 402, 502, 608). Although only a single AF 806 (e.g., AF 504, 616) is illustrated, data may enter a core network from multiple AFs. AFs that generate the data may need to configure the Unified Data Management (UDM) 802 to allow for transport of their data to the UE using NIDD. Therefore, FIG. 8 illustrates AF 808 sending a configuration request 801 to the NEF 804 (e.g., NEF 514). The NEF performs NEF handling in response to the configuration request and authorizes the AF using the UDM information, e.g., sending an NIDD authorization request 803 to UDM 802. UDM 802 responds to the request with an NIDD Authorization Response 805 and also provides SDC-UPF information in the authorization response. The NEF 804 then forwards the SDC-UPF information for SDF-UPF to the AF 806 in an NIDD configuration response 807. The AF 806 initiates an interface with the SDC-UPF indicated by the SDC-UPF information, e.g., AF 806 may send an interface set up request to a SDC-UPF based on the SDC-UPF identifier and receive an interface set up response from the SDC-UPF. In one example, the interface may comprise a T8 interface. However, in other examples, different protocols than T8 may be used for the interface between the AF 806 and the SDC-UPF. FIG. 9 illustrates an example communication flow for an AF configuration for an interface (e.g., interface 501, 601) set up between an AF 908 and an SDC-UPF 902. Prior to the NIDD PDU session set up with an NEF 906, an AF 908 may generate data needed to configure the UDM (e.g., UDM 802) to allow for transport of small data to a UE using NIDD. In order to configure an interface set up, an SMF 904 may send a PDU session set up indication 901 to NEF 906. The NEF 906 may send an NIDD reconfiguration message 903 to AF 908, e.g., with a request to set up an interface to an SDC-UPF. Thus, the NIDD configuration message 903 may include information regarding an SDC-UPF 902. The AF then sets up the interface by sending a set up request message 905 to the SDC-UPF 902 indicated in the message 903. In response, the AF 908 may receive a set up response 907 from the SDC-UPF to establish the interface between the AF 908 and the SDC-UPF 902. The interface may then be used to receive data from the AF to the SDC-UPF. The SDC-UPF may process, buffer, and/or transport the data, e.g., in an RRC payload to the RAN for transmission to the UE.

FIG. 10 illustrates an example of NIDD PDU session connection set up through a UPF 1014 (e.g., SDC-UPF 402, 502, 608, 902, etc.) for small data transmission, as described in connection with the examples of FIGS. 4-9. A UE 1002 may send a PDU session request 1003 to AMF 1006. The request 1003 may indicate the NEF 1014 as the Access Point Name (APN), and hence indicate that the PDU session request is for a small data session with NIDD. AMF 1006 may send a message 1005 to SMF 1008 as part of creating the PDU session. The SMF 1008 may request information at 1007 from UDM 1012 (e.g., UDM 802). A PDU session authentication and authorization 1009 may be performed, which may include the SMF 1008 and UE 1002 negotiating keys to be used by the UPF 1016. An SDC-UPF may be selected at 1011 by the SMF 1008. An N4 interface may be set up at 1013 between SMF 1008 and the selected UPF 1016. An Nsm interface may be established or modified between SMF 1008 and NEF 1014 at 1015. SDC-UPF information may be provided, and the establishment/modification may lead to the NEF triggering an interface set up between the UPF and AF. The NEF may be sent an indication 1017 to AF 1018 to set up a session. In one example, the interface may comprise a T8 interface and the session may comprise a T8 session. The interface set up may be set up between UPF 1016 and AF 1018 at 1019, as described in connection with FIG. 9. A PDU session response message 1021 may be sent from SMF to AMF regarding the Nsm establishment/modification. The PDU session response may correspond to uplink and/or downlink data. A PDU session establishment accept may be sent, triggering an N2 set up. N3 information may be obtained, e.g., N3 information may be provided to the AMF/SMF. Uplink small data 1025 may then be transported between the UE 1002 and the AF 1018 based on processing at UPF 1016. The data may be included in an RRC message from the UE 1002 to the RAN 1004, which provides the message to UPF 1016. The UPF may process the data and provide the data to AF 1018, e.g., over an interface directly from UPF 1016 to AF 1010. Similarly, downlink small data 1027 may be transported between UE 1002 and AF 1018 based on processing of the data at UPF 1016. As described in connection with FIG. 5, the small data may be received by the UPF 1016 directly from AF 1018. The UPF 1016 may process the data and provide it to RAN 1004 to be communicated between the UE 1002 and RAN 1004 in an RRC payload forwarded by RAN 1004. As illustrated at 1001, a prior AF configuration may be performed between NEF 1014 and AF 1018, e.g., as described in connection with FIG. 8.

An identifier may be needed to enable the small data communication. When an Access Node (AN), e.g., a base station, receives a frame, the AN may need to be able to determine the SDC-UPF to which the frame should be routed. This information may need to be available to all of the ANs, e.g., in a UE registration area. When an SDC-UPF sends a frame, the RAN node may need to determine to which UE the frame is sent. This information may be provided as a Small Data Forwarding ID (SDFID). The SMF may create a per PDU session identifier, e.g., the SDFID. The SDFID may be based on a UE identifier (e.g., a Temporary Mobile Subscriber Identifier, TMSI), an SDC-UPF identifier, and/or the PDU session ID. This SDFID may be indicated to the UE and the SDC-UPF of the session, as well as to the RAN, in the registration area.

Figure 11:
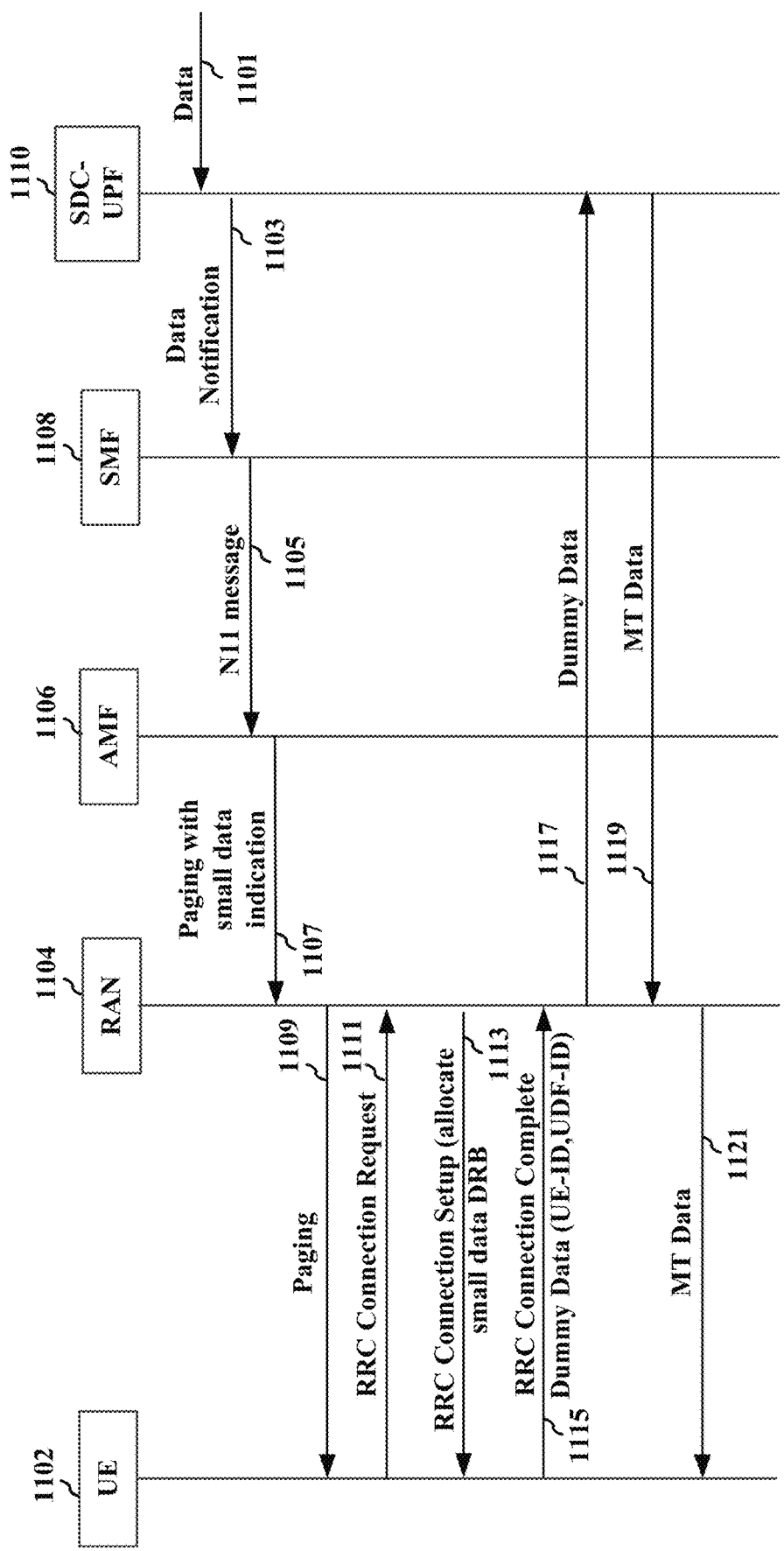
FIG. 11 illustrates an example communication flow for Mobile Terminated Data Delivery.

FIG. 11 illustrates an example of Mobile Terminated (MT) data delivery for a UE in an idle mode, e.g., CM-IDLE/RRC-IDLE. When SDC-UPF 1110 (e.g., SDC-UPF 402, 502, 608, 902, 1016) receives data 1101 from an AF or DN, the SDC-UPF may send a data notification 1103 to SMF 1108. The SMF 1108 may the send an indication 1105 to AMF 1106 to page the UE 1102. The indication 1105 may comprise an N11 message. The AMF 1106 may initiate a paging of the UE through RAN 1104 a 1107. The paging message may include an indication that the data corresponds to small data. The RAN sends a page 1109 to UE 1102. In response to receiving the page, the UE sends a connection request 1111 to the RAN, which may include a small data indication. The RAN may send an RRC connection set up message 1113. The RRC connection may include an allocation of a small data Dedicated Radio Bearer (DRB) that is used for small data communication between an AF/DN and a UE. The UE may send an RRC connection complete response 1115 to the RAN 1104. The response 1115 may comprise an indication of a UE identifier and a UPF identifier. For example, the response may comprise dummy data along with a UE-ID and UPF-ID. The RAN may use the UPF-ID to forward the dummy data 1117 to the SDC-UPF 1110. The receipt of the dummy data may indicate to the SDC-UPF that the UE is active and ready to receive the data 1101. For example, a UE may be considered awake/active when the UE is in an RRC connected state. In response to receiving the dummy data, the SDC-UPF 1110 may forward the data 1101 that has been processed by the SDC-UPF as MT data 1119, to the RAN that sent the dummy data, for transport to the UE. The RAN 1104 may then forward the data 1121 to the UE 1102. The RAN may forward the data 1121 to the UE based on a UPF-ID carried with the data 1119 and based on the UE-ID/UPF-ID sent by the UE with the dummy data at 1115.

Figure 12:
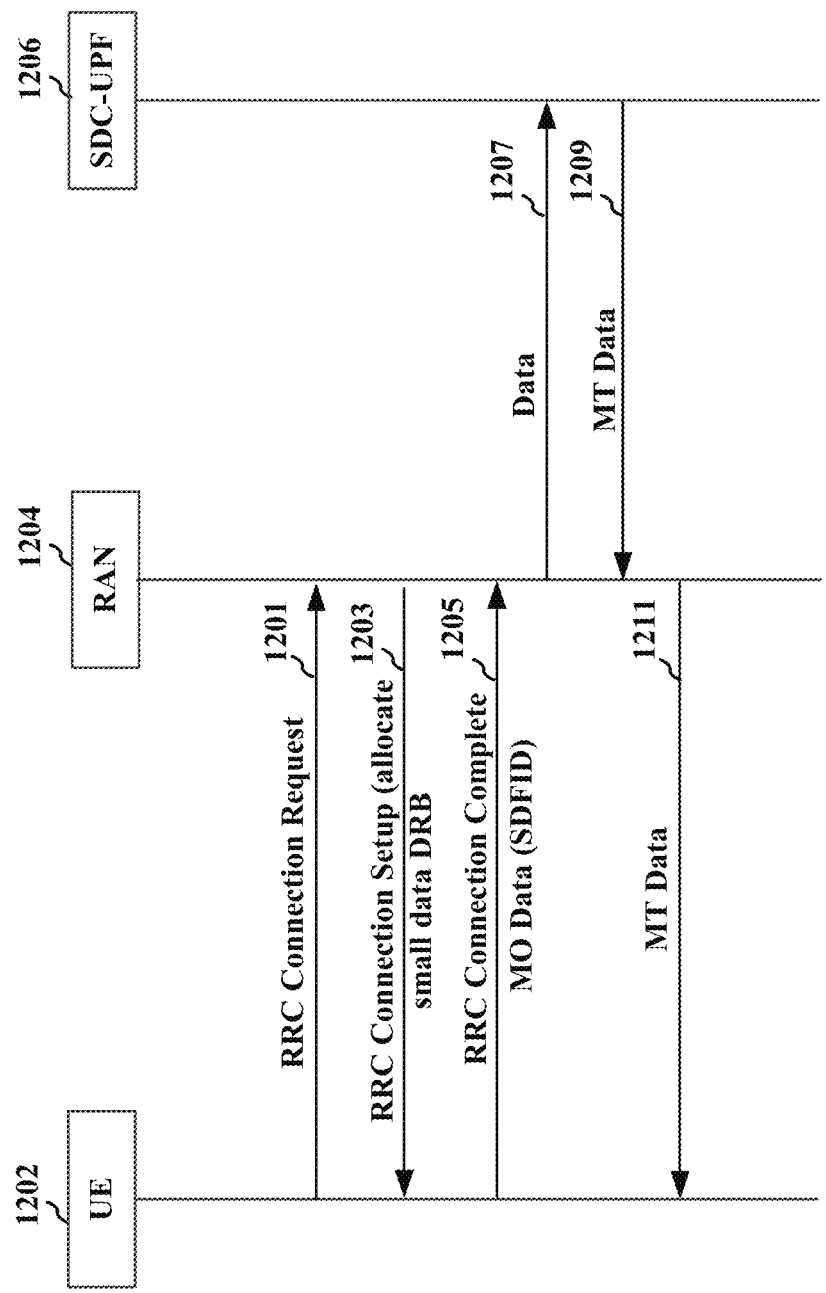
FIG. 12 illustrates an example communication flow for Mobile Originated Data Delivery.

FIG. 12 illustrates an example flow of communication for Mobile Originated (MO) data delivery. In FIG. 12, UE 1202 sends an RRC connection request 1201 to RAN 1204 to transmit small data. The RAN 1204 may respond with an RRC connection set up message 1203. The set up message 1203 may allocate a small data DRB. The UE may respond to the set up message 1203 with an RRC connection complete message 1205. The response from the UE may include the MO data and may also include an SDFID, which may be based on a UE identifier, a UPF identifier, and/or a PDU session identifier. The RAN may use the SDFID to forward the MO data to the corresponding SDC-UPF 1206. The SDC-UPF 1206 may respond by forwarding MT data 1209 to the RAN 1204 that sent the MO data 1207. The RAN 1204 may then forward the MT data 1211 to UE 1202.

Figure 13:
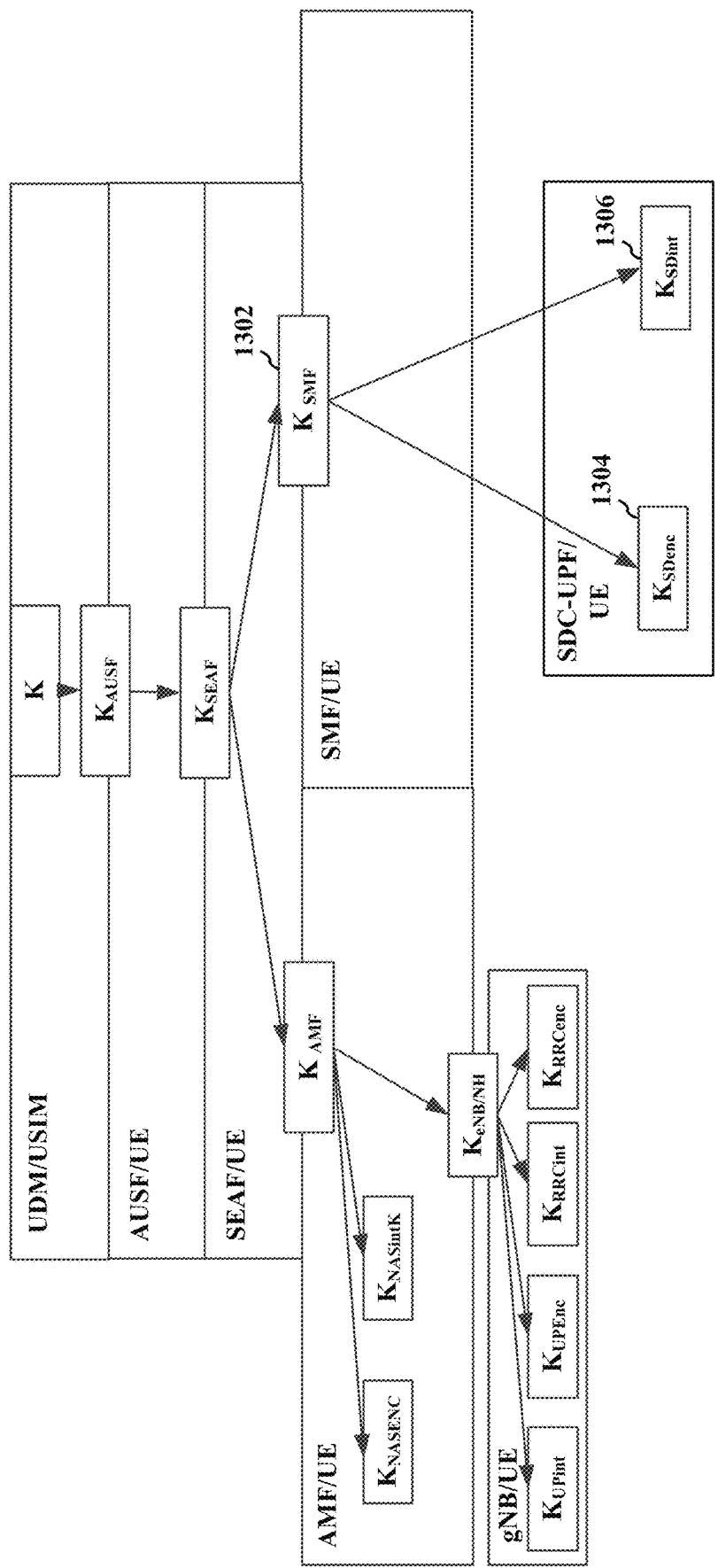
FIG. 13 illustrates an example key hierarchy for data delivery.

An SDC-UPF may encrypt small data from an AF or DN before forwarding the data to RAN for transportation to a UE. The encryption may be based on a key derived by an SMF and may be specific to the SDC-UPF. FIG. 13 illustrates an example key hierarchy for CIoT data. As illustrated at 1302, a key $K_{SMF}$ may be derived for the SMF, e.g., during the PDU session authorization that occurs in connection with PDU session set up. An example of PDU session set up is illustrated in FIG. 10. The SMF may then derive a key that is sent to the SDC-UPF and to the UE. For example, SMF may derive keys $K_{SDenc}$ 1304 and $K_{SDint}$ 1306 and may push the keys to the SDC-UPF. The SDC-UPF may then use the key(s) received from the SMF to encrypt small data from an AF/DN before forwarding the small data to the RAN for transmission to the UE. Similarly, the SDC-UPF may use the keys to decrypt small data received from the UE before sending the data to an AF/DN. The UE sends the data to the RAN as an RRC payload, i.e. data is encapsulated in a RRC protocol frame. The RAN removes the RRC portion and forwards the data, which is still encrypted, to the SDC-UPF. The SDC-UPF performs decryption of the data received from the RAN.

Figure 14:
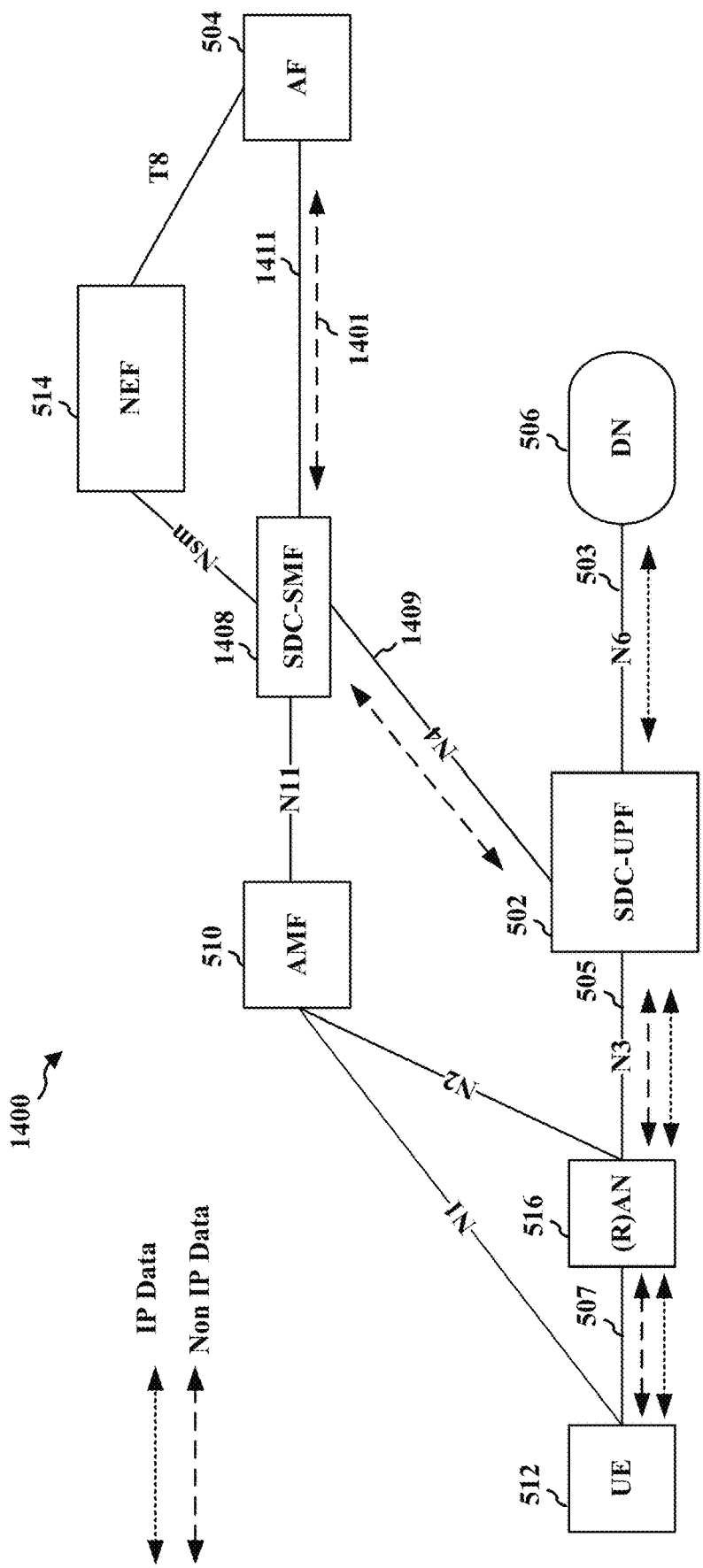
FIG. 14 illustrates an example network architecture for data delivery through an SDC-UPF.

FIG. 14 illustrates an example network architecture 1400 similar to the network architecture 500 in FIG. 500. Similar network components have been indicated with the same reference numbers to the network architecture in FIG. 5. FIG. 14 illustrates the network architecture 1400 having an alternate termination 1411 than the termination 511 in FIG. 5. In FIG. 14, rather than having a path directly from AF 504 to SDC-UPF 502, an SDC-SMF 1408 may terminate the interface 1411 for small data 1401 from AF 504. The data may then be forwarded from the SDC-SMF to the SDC-UPF 502 for transfer to the UE 512 over the user plane. The data may be forwarded, e.g., via an N4 interface 1409 from the SDC-SMF 1408 to the SDC-UPF 502. The SDC-UPF 502 may process the data and/or provide the data to RAN 516 for transmission to the UE 512 in an RRC message, as described in connection with FIG. 5.

Figure 15:
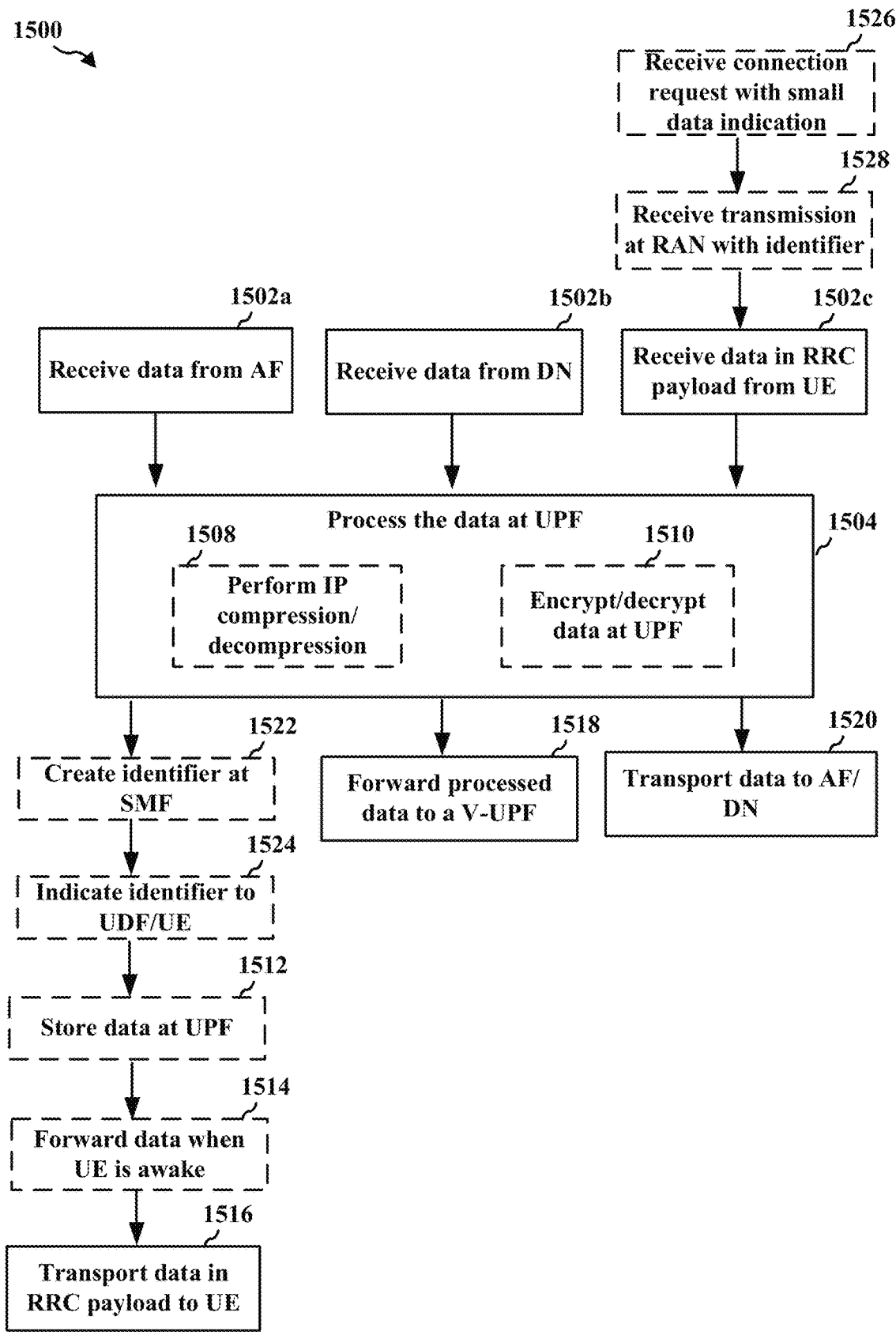
FIG. 15 is a flowchart of a method of wireless communication.

FIG. 15 is a flowchart 1500 of a method of wireless communication at a core network. Optional aspects of the method are illustrated with a dashed line. The method enables the transmission of small amounts of data in a manner that reduces the amount of accompanying overhead signaling.

At 1502*a*, 1502*b*, or 1502*c*, data is received at a core network component from at least one of an AF, a DN and a user equipment. The data may be received, e.g., by a small data capable UPF (e.g., SDC-UPF 402, 502, 608, 902, 1016, 1110, 1206). The data may comprise small data, e.g., data having a size below a threshold.

At 1504, the UPF processes the data for transport, wherein the data is below a size threshold, and wherein the UPF is configured to allow data below the size threshold to be communicated between the UPF and the UE without initiating a bearer set up protocol. The UPF may comprise an SDDSF, e.g., as described in connection with FIG. 4. The small data may be communicated with a low overhead, e.g., in an RRC payload between a UE and a RAN. Thus, the UPF may consider the size of the data in determining how to handle the data.

In one example, at 1502*a*, the data is received at the core network from an AF (e.g., AF 504, 616, 806, 908, 1018) external to the core network via an interface, e.g., via a T8 interface. T8 is merely one example, and other protocols than T8 may also be used in receiving the data at an SDC-UPF directly from an AF. In another example, at 1502*b*, the data may be received at the core network from a DN (e.g., DN 506, 618) external to the core network, e.g., via an N6 interface. As illustrated in FIGS. 5 and 6, the IP data may be received at an SDC-UPF directly from the DN. The UPF processes the received data at 1504, whether received from the AF or the DN, and transports the data to the user equipment at 1516 in an RRC payload, as described in connection with any of FIGS. 5-14. The data may be transmitted to the user equipment via a RAN, e.g., as described in connection with FIGS. 5-14.

In yet another example, at 1502*c*, the data may be received in an RRC payload from the user equipment. The data may be received in the RRC payload via the RAN. The data portion of the RRC payload may be forwarded from the RAN to the UPF, which processes the data and transports the data to the AF or to the DN. The UPF may terminate an interface for the data entering the core network from an AF, e.g., as in the examples illustrated in FIG. 5.

Thus, in the example in which the data is received from an AF at 1502*a* or a DN at 1502*b*, the small data may be processed for transport to the UE at 1516, e.g., in an RRC payload. The UPF may perform IP compression, e.g., IP header compression at 1508. Similarly, when the data is received from the UE and is directed to the DN, the UPF may perform IP decompression before transporting the data to the DN or AF, e.g., at 1520. As well, as part of processing the data at the UPF, as illustrated at 1510, the UPF may encrypt the data for transmission to the UE. The encryption may be based on an SMF encryption key and may be specific to the UPF. Similarly, when the data is received from the UE, the UPF may decrypt the data.

At times, the UE may be in an idle mode or other low power mode, in which the UE is not actively receiving transmissions. The UPF may store the data at 1512 when the user equipment is in an idle mode. Then, at 1514, the UE may forward the data to the user equipment from the UPF when the user equipment is in an active mode, e.g., RRC connected state. FIG. 11 illustrates an example of storage of data and later communication with a UE when the UE is in an idle mode. Thus, the UPF may buffer data for the UE while the UE is in an idle mode and/or inactive mode.

As in the example illustrated in FIG. 6, the UPF may comprise a H-UPF. Thus, at 1518, the UPF may forward the processed data to a V-UPF for transmission to the user equipment. As described in connection with FIG. 6, the V-UPF might not have the same SDC capabilities as the H-UPF. Thus, the H-UPF may process the data, e.g., at 1504, prior to transmission to the V-UPF.

As described in connection with FIGS. 11 and 12, an identifier, e.g., an SDFID or other identifier based on a UE-ID and/or SDC-UPF ID to communicate small data between a UE and UPF. Thus, at 1522, an identifier may be created at an SMF. The identifier may be based on at least one of a UE identifier, a tunnel identifier, or a UPF Identifier. The identifier may be indicated, at 1524, to the UPF and the UE. The identifier may be included in a header of the data.

As described in connection with FIG. 11, the core network may receive, at 1526, a connection request at the RAN from the user equipment, wherein the connection request comprises a small data indication. The RAN may then set up an RRC connection with an allocation of a small data DRB. The data may then be communicated from the UPF to the UE, via the RAN, using the allocated small data DRB.

At 1528, the core network may receive a transmission from the user equipment at the RAN comprising an identifier based on a user equipment identifier and a UPF identifier. FIG. 12 illustrates an example in which a RAN receives data comprising an identifier, e.g., an SDFID. The RAN may forward the transmission from the RAN to the UPF, wherein the UPF forwards the data to the RAN for transmission to the user equipment in response to receiving the transmission from the RAN.

Figure 16:
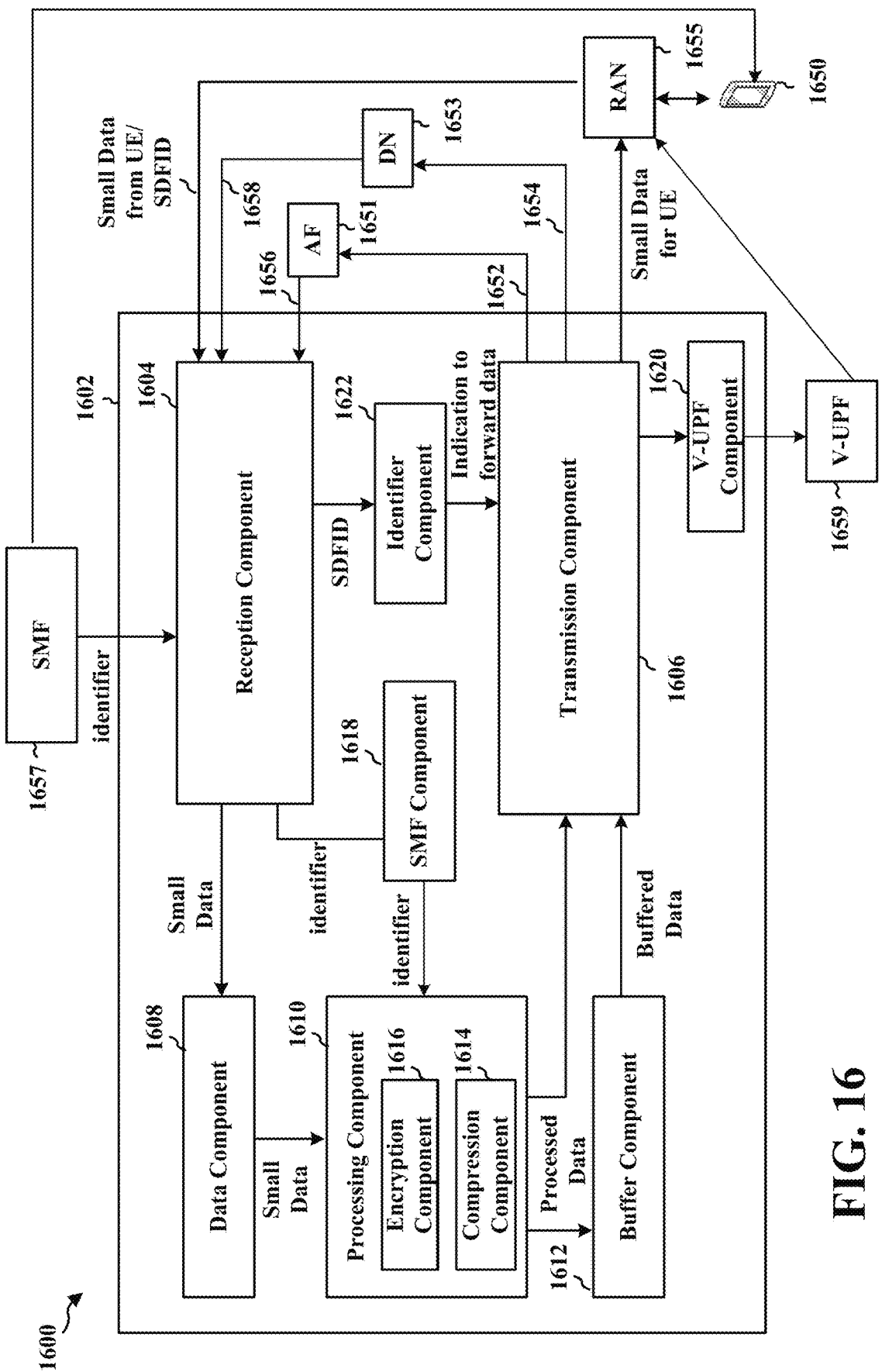
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a core network component, e.g., a UPF (e.g., SDC-UPF 402, 502, 602, 1016, 1206). The apparatus includes a reception component 1604 that receives communication, e.g., including small data and a transmission component 1606 that transmits communication including small data.

The apparatus may include additional components that perform each of the blocks of the algorithm in the aforementioned flowcharts of FIGS. 9-12 and 15. As such, each block in the aforementioned flowcharts of FIGS. 9-12 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The apparatus may comprise a data component 1608 configured to receive data from at least one of an AF 1651, a DN 1653, and a UE 1650 (e.g., via RAN 1655). The apparatus comprises a processing component 1610 configured to process the data at a UPF, wherein the data is below a size threshold, wherein the UPF is configured to allow small data below the size threshold to be communicated between the UPF and the user equipment without initiating a bearer set up protocol. The apparatus may further comprise a transmission component 1606 configured to transport the data to another network component. For example, when the data 1656, 1658 is received from the AF or the DN, the transmission component 1606 may transport the data from the UPF to the user equipment as an RRC payload. The apparatus may comprise a buffer component 1612 configured to store the data at the UPF for the user equipment when the user equipment is in an idle mode and/or inactive mode. The transmission component 1606 may be configured to forward the data to the user equipment from the UPF when the user equipment is in an active mode, e.g., RRC connected. The data may be received by the reception component 1604 over a direct interface from the AF 1651.

The processing component 1610 may comprise a compression component 1614 configured to perform IP compression on the data. The processing component 1610 may comprise an encryption component 1616 configured to encrypt the data at the UPF for transmission to the user equipment, e.g., via RAN 1655. The processing component 1610 may be comprised in an SDDSF of a UPF. When the data is received in an RRC payload from the UE 1650, the transmission component 1606 may be configured to transport the data 1652, 1654 from the UPF to the AF or the DN. The apparatus may comprise a home UPF and may comprise a V-UPF component 1620 configured to forward the processed data to a visitor UPF 1659, wherein the visitor UPF forwards the processed data to the RAN for transmission to the user equipment. The apparatus may comprise an SMF component 1618 may receive an identifier generated at SMF 1657 based on at least one of a user equipment identifier, a tunnel identifier, or a UPF Identifier; and. The SMF may similarly provide the identifier to the UE 1650. The identifier may be included in a header of the data. The RAN 1655 may be configured to receive a connection request at the RAN from the user equipment, wherein the connection request comprises a small data indication. The UPF may comprise an identifier component 1622 such that when the RAN receives a transmission from the user equipment at the RAN comprising an identifier based on a user equipment identifier and a UPF identifier e.g., an SDFID, and forwards the transmission to the apparatus, the transmission component 1606 forwards the data to the RAN for transmission to the user equipment in response to receiving the transmission from the RAN.

Figure 17:
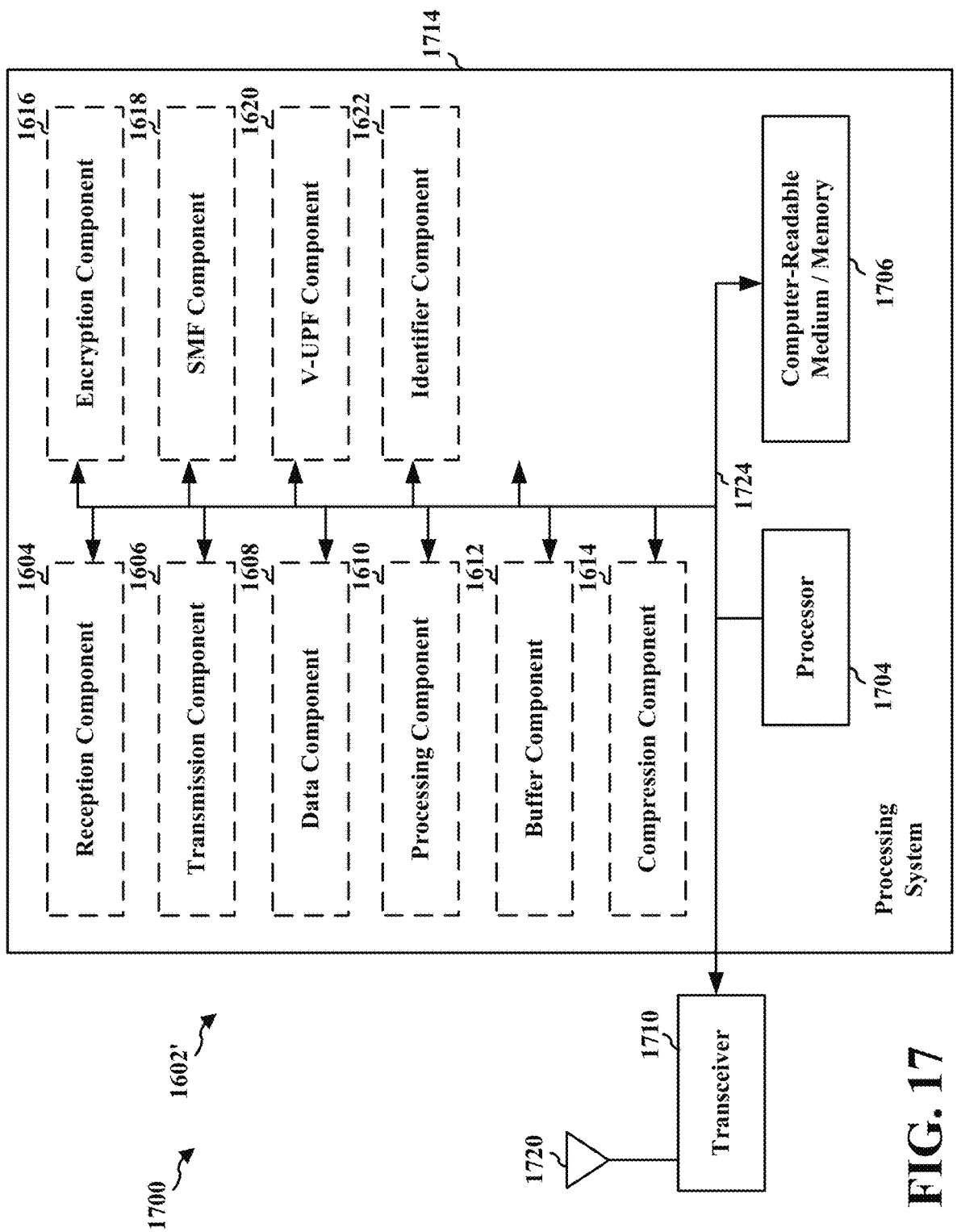
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, 1618, 1620, 1622, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, 1616, 1618, 1620, 1622. The components may be software components running in the processor 1704, resident/stored in the computer readable medium/memory 1706, one or more hardware components coupled to the processor 1704, or some combination thereof. The processing system 1714 may be a component of the core network, e.g., of an UPF and may include the memory and/or at least one of the TX processor, the RX processor, and the controller/processor.

In one configuration, the core network for wireless communication may include means for receiving data from at least one of an AF, a DN, or a UE; means for processing the data at a UPF, wherein the data is below a size threshold, and wherein the UPF is configured to allow data below a size threshold to be communicated between the UPF and the user equipment without initiating bearer set up protocol; means for transporting the data from the UPF to the user equipment as an RRC payload; means for transporting the data from the UPF to the AF or the DN; means for storing the data at the UPF for the user equipment when the user equipment is in an idle mode; means for forwarding the data to the user equipment from the UPF when the user equipment is in an active mode; means for performing IP compression on the data by the UPF; means for encrypting the data at the UPF for transmission to the user equipment; means for creating an identifier at a SMF based on at least one of a UE identifier, a tunnel identifier, or a UPF Identifier; means for indicating the identifier to the UPF and the UE, wherein the identifier is included in a header of the data; means for receiving a connection request at the RAN from the user equipment, wherein the connection request comprises a small data indication; means for receiving a transmission from the user equipment at the RAN comprising an identifier based on a user equipment identifier and a UPF identifier; means for forwarding the transmission from the RAN to the UPF, wherein the UPF forwards the data to the RAN for transmission to the user equipment in response to receiving the transmission from the RAN; and means for forwarding the processed data to a visitor UPF, wherein the visitor UPF forwards the processed data to the RAN for transmission to the user equipment.

The aforementioned means may be one or more of the aforementioned components of the apparatus core network and/or a processing system of the apparatus core network configured to perform the functions recited by the aforementioned means.

Figure 18:
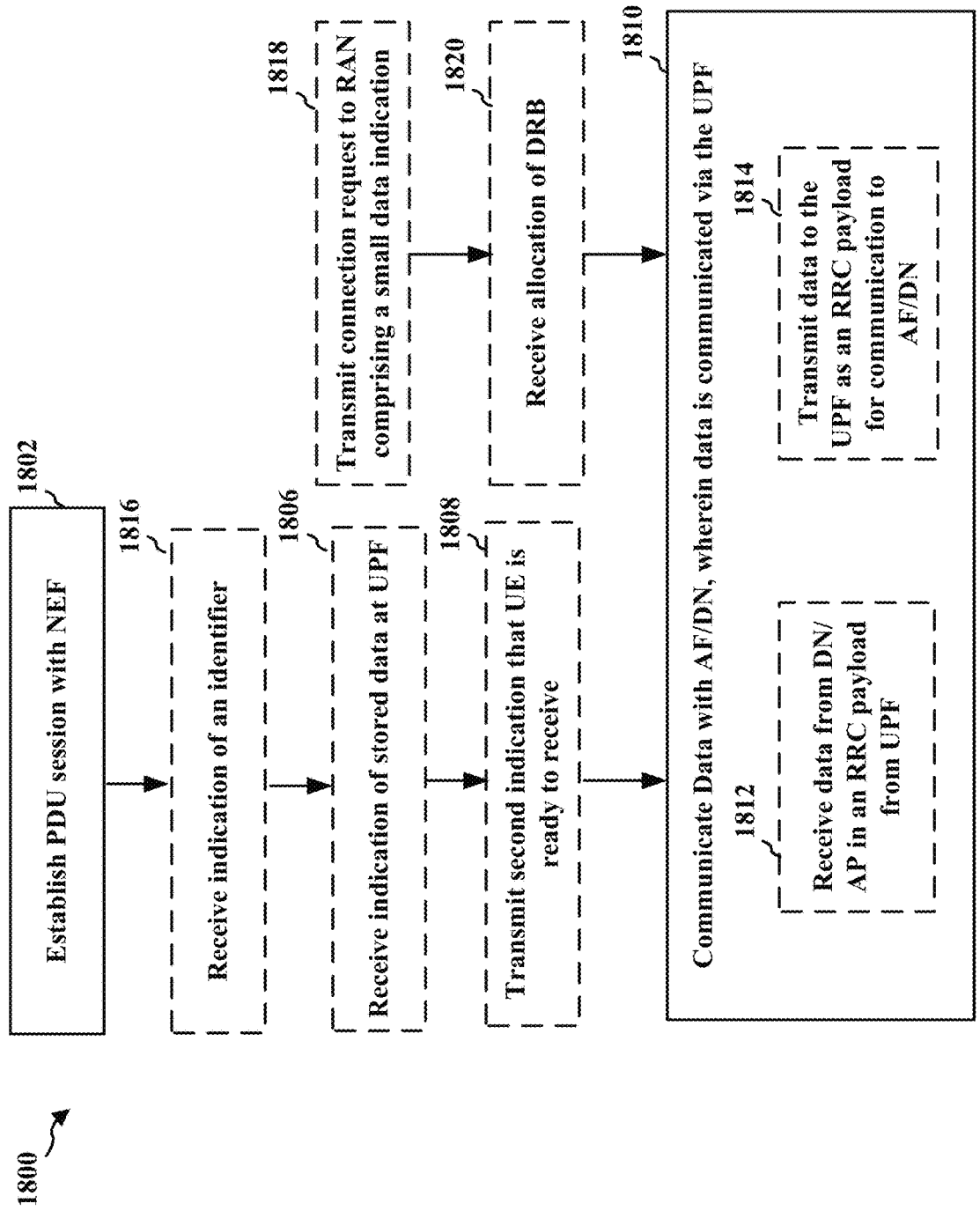
FIG. 18 is a flowchart of a method of wireless communication.

FIG. 18 is a flowchart 1800 of a method of wireless communication at a user equipment (e.g., 104, 350, 512, 604, 1002, 1102, 1202). Optional aspects of the method are illustrated with a dashed line.

At 1802, the UE establishes a PDU session with an NEF (e.g., NEF 514, 804, 906, 1014). At 1810, the UE communicates the data with at least one of an AF, a DN, wherein the data is communicated with a UPF (e.g., SDC-UPF 402, 502, 608, 902, 1016, 1110, 1206) for transport with a low overhead as an RRC payload, e.g., without initiating a bearer set up protocol. The data may comprise small data, e.g., data having a size below a threshold.

The communicating the data at 1810 may include receiving the data at 1812 from the AF or the DN in an RRC payload received from the UPF. In another example, the communicating the data at 1810 may include transmitting at 1814 the data to UPF in an RRC payload for transport to the AF or the DN.

The UPF may buffer data for a UE in an idle mode. Therefore, the UE may receive an indication of stored data for the user equipment at the UPF at 1806. At 1808, the UE may transmit a second indication that the UE is ready to receive the stored data. Then, the UE may receive the data from the UPF, e.g., at 1812 in response to the second indication.

As described in connection with FIGS. 11 and 12, the UE may receive, at 1816, an indication of an identifier based on at least one of a UE identifier, a tunnel identifier, or a UPF Identifier, wherein the identifier is included in a header of the data.

At 1818, the UE may transmit a connection request to the RAN, wherein the connection request comprises a small data indication. FIG. 12 illustrates an example connection request. As the connection request indicates small data, the UE may receive, at 1820, an allocation of a small data DRB.

The transmission of data at 1814 may include a transmission to the RAN comprising an identifier based on a user equipment identifier and a UPF identifier, wherein the data is received in response to the transmission.

The data may comprise encrypted data encrypted based on an SMF encryption key.

Figure 19:
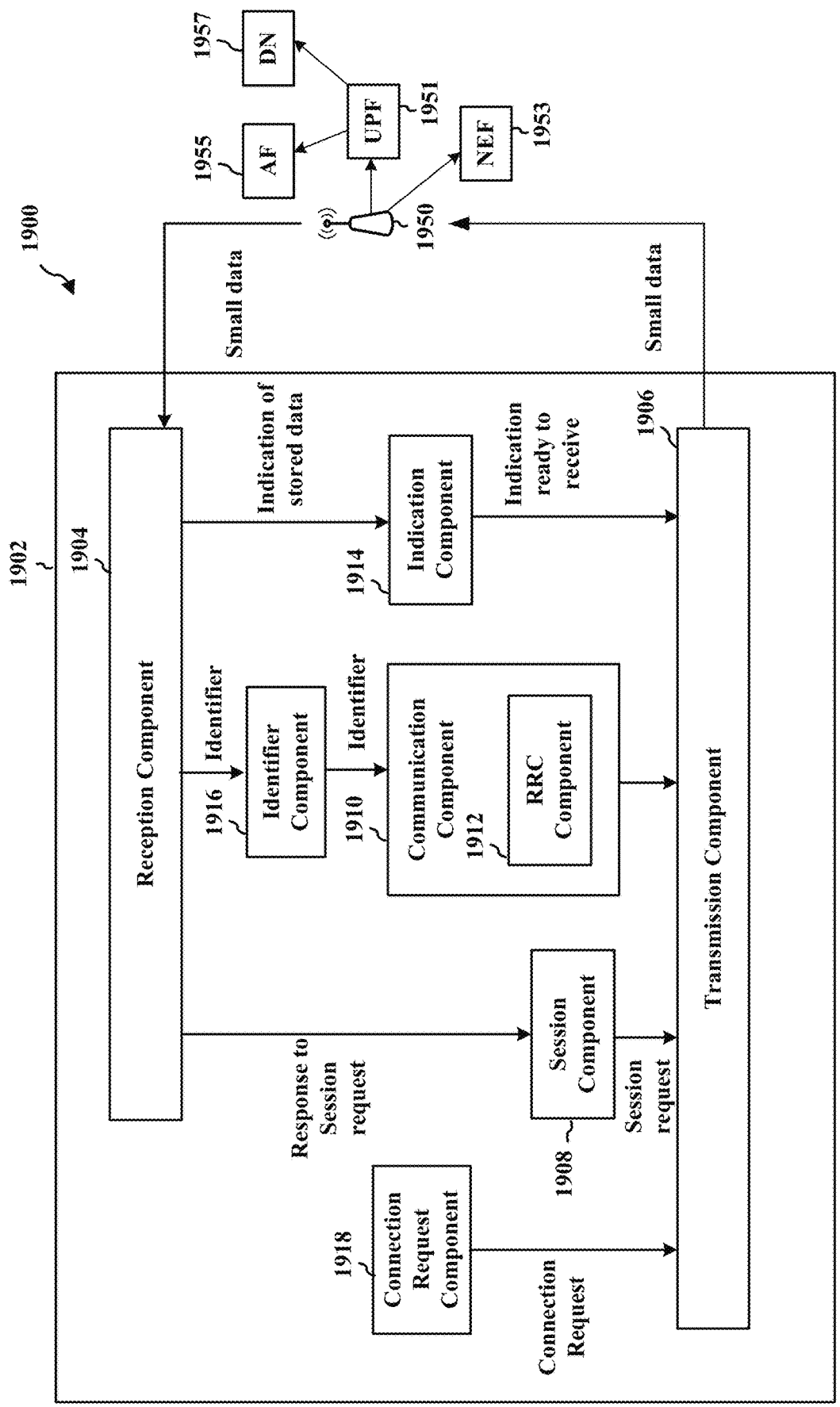
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be a UE (e.g., UE 104, 350, 512, 604, 1002, 1102, 1202, 1650). The apparatus includes a reception component 1904 that receives downlink communication and a transmission component 1906 that transmits uplink communication. The apparatus includes a session component 1908 configured to establish a PDU session with a NEF 1953 for communication of small data below a threshold size. The apparatus includes a communication component 1910 configured to communicate the data with at least one of an AF 1955 or a Data Network DN 1957, wherein the data is communicated with a UPF 1951 for transport with a low overhead as an RRC payload. The communication component may include an RRC component 1912 configured to receive the data from the AF 1955 or the DN 1957 based on the RRC payload received from a RAN 1950 and/or to transmit the data to the UPF 1951 as the RRC payload for transport to the AF 1955 or the DN 1957. The apparatus may include an indication component 1914 configured to receive an indication of stored data for the user equipment at the UPF and to transmit a second indication that the user equipment is ready to receive the stored data. The communication component may then receive the data from the UPF 1951 in response to the second indication. The apparatus may include an identifier component 1916 configured to receive an indication of an identifier based on at least one of a user equipment identifier, a tunnel identifier, or a UPF Identifier, wherein the identifier is included in a header of the data. The apparatus may include a connection request component 1918 configured to transmit a connection request to the RAN 1950, wherein the connection request comprises a small data indication. The identifier component 1916 may be further configured to transmit a transmission to the RAN 1950 comprising an identifier based on a user equipment identifier and a UPF identifier, wherein the data is received in response to the transmission.

The UE may include components that perform aspects of the algorithm in the aforementioned flowcharts of FIGS. 5-14 and 18. As such, blocks in the aforementioned flowcharts of FIGS. 5-14 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
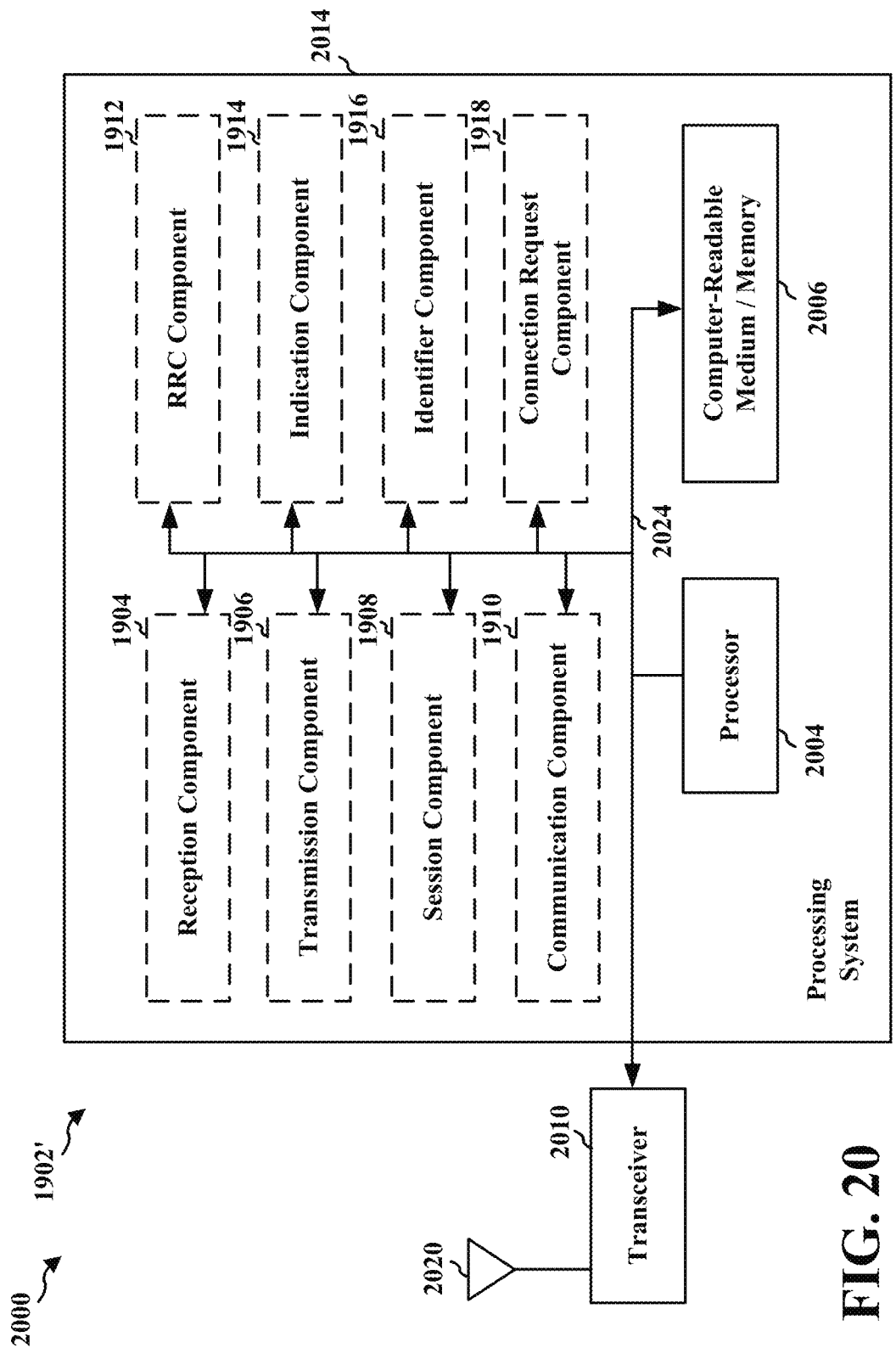
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, 1914, 1916, 1918, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1906, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1912, 1914, 1916, 1918. The components may be software components running in the processor 2004, resident/stored in the computer readable medium/memory 2006, one or more hardware components coupled to the processor 2004, or some combination thereof. The processing system 2014 may be a component of the UE 350 and may include the memory 360 and/or at least one of the TX processor 368, the RX processor 356, and the controller/processor 359.

In one configuration, the UE for wireless communication may include means for establishing a PDU session with a NEF for communication of data below a threshold size; means for communicating data with at least one of an AF or DN, wherein the data is communicated with the UPF for transport with a low overhead as a RRC payload; means for receiving the data from the AF or the DN based on the RRC payload received from a RAN; means for transmitting the data to the UPF as the RRC payload for transport to the AF or the DN; means for receiving an indication of stored data for the user equipment at the UPF; means for transmitting an second indication that the UE is ready to receive the stored data; means for receiving the data from the UPF in response to the second indication; means for receiving an indication of an identifier based on at least one of a UE identifier, a tunnel identifier, or a UPF Identifier, wherein the identifier is included in a header of the data; means for transmitting a connection request to the RAN, wherein the connection request comprises a small data indication; and means for transmitting a transmission to the RAN comprising an identifier based on a user equipment identifier and a UPF identifier, wherein the data is received in response to the transmission. The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a core network, comprising:
   receiving data from at least one of an Application Function (AF), a Data Network (DN), and a user equipment;
   processing the data at a User Plane Function (UPF), wherein the data is below a size threshold, wherein the UPF is configured to allow small data below the size threshold to be communicated between the UPF and the user equipment without initiating a bearer set up protocol; and
   transmitting the data from the UPF to the user equipment or receiving the data from the user equipment as a Radio Resource Control (RRC) payload without initiating the bearer set up protocol.

2. The method of claim 1, wherein the data is received from the AF or the DN, wherein the core network transmits the data from the UPF to the user equipment as the RRC payload.

3. The method of claim 2, further comprising:
   storing the data at the UPF for the user equipment when the user equipment is in an idle mode; and
   forwarding the data to the user equipment from the UPF when the user equipment is in an active mode.

4. The method of claim 2, wherein the UPF terminates a T8 interface for the data.

5. The method of claim 2, the method further comprising:
   performing Internet Protocol (IP) compression on the data by the UPF.

6. The method of claim 2, further comprising:
   encrypting the data at the UPF for transmission to the user equipment.

7. The method of claim 1, wherein the data is received in the RRC payload from the user equipment, the method further comprising:
   transmitting the data from the UPF to the AF or the DN.

8. The method of claim 1, wherein the UPF comprises a small data delivery service function (SDDSF).

9. A method of wireless communication at a core network, comprising:
   receiving data from at least one of an Application Function (AF), a Data Network (DN), and a user equipment;
   processing the data at a User Plane Function (UPF), wherein the data is below a size threshold, wherein the UPF is configured to allow small data below the size threshold to be communicated between the UPF and the user equipment without initiating a bearer set up protocol;

creating an identifier at a Session Management Function (SMF) based on at least one of a user equipment identifier, a tunnel identifier, or a UPF Identifier; and
indicating the identifier to the UPF and the user equipment, wherein the identifier is included in a header of the data.

10. The method of claim 1, further comprising:
receiving a connection request at a radio access network (RAN) from the user equipment, wherein the connection request comprises a small data indication.

11. The method of claim 1, further comprising:
receiving a transmission from the user equipment at a radio access network (RAN) comprising an identifier based on a user equipment identifier and a UPF identifier.

12. The method of claim 11, further comprising:
forwarding the transmission from the RAN to the UPF, wherein the UPF forwards the data to the RAN for transmission to the user equipment in response to receiving the transmission from the RAN.

13. The method of claim 12, wherein processing the data comprises encrypting the data at the UPF before forwarding the data to the RAN.

14. The method of claim 13, wherein the data is encrypted at the UPF based on a Session Management Function (SMF) encryption key.

15. The method of claim 1, wherein the UPF comprises a home UPF, and wherein the processing comprises performing internet protocol compression, the method further comprising:
forwarding the processed data to a visitor UPF, wherein the visitor UPF forwards the processed data to a Radio Access Network (RAN) for transmission to the user equipment.

16. An apparatus for wireless communication at a core network, comprising:
a memory; and
at least one processor coupled to the memory and configured to:
receive data from at least one of an Application Function (AF), a Data Network (DN), and a user equipment;
process the data at a User Plane Function (UPF), wherein the data is below a size threshold, wherein the UPF is configured to allow small data below the size threshold to be communicated between the UPF and the user equipment without initiating a bearer set up protocol; and
transmit the data from the UPF to the user equipment or receive the data from the user equipment as a Radio Resource Control (RRC) payload without initiating the bearer set up protocol.

17. The apparatus of claim 16, wherein the data is received from the AF or the DN, the at least one processor being configured to:
transmit the data from the UPF to the user equipment as the RRC payload.

18. The apparatus of claim 16, wherein the data is received in the RRC payload from the user equipment, the at least one processor being further configured to:
transport the data from the UPF to the AF or the DN.

19. A method of wireless communication at a user equipment, comprising:

establishing a Protocol Data Unit (PDU) session with a Network Exposure Function (NEF) for communication of data below a threshold size; and
communicating the data with at least one of an Application Function (AF) or a Data Network (DN), wherein the data is communicated with a User Plane Function (UPF) for transport with a low overhead as a Radio Resource Control (RRC) payload without initiating the bearer set up protocol.

20. The method of claim 19, wherein the communicating the data comprises:
receiving the data from the AF or the DN based on the RRC payload received from a Radio Access Network (RAN).

21. The method of claim 19, wherein the communicating the data comprises:
transmitting the data to the UPF as the RRC payload for transport to the AF or the DN.

22. The method of claim 19, further comprising:
receiving first indication of stored data for the user equipment at the UPF;
transmitting a second indication that the user equipment is ready to receive the stored data; and
receiving the data from the UPF in response to the second indication.

23. The method of claim 22, further comprising:
receiving an indication of an identifier based on at least one of a user equipment identifier, a tunnel identifier, or a UPF Identifier, wherein the identifier is included in a header of the data.

24. The method of claim 19, further comprising:
transmitting a connection request to a radio access network (RAN), wherein the connection request comprises a small data indication.

25. The method of claim 19, further comprising:
transmitting a transmission to a radio access network (RAN) comprising an identifier based on a user equipment identifier and a UPF identifier, wherein the data is received in response to the transmission.

26. The method of claim 19, wherein the data is encrypted at the UPF based on a UPF based encryption key.

27. An apparatus for wireless communication at a user equipment, comprising:
a memory; and
at least one processor coupled to the memory and configured to:
establish a Protocol Data Unit (PDU) session with a Network Exposure Function (NEF) for communication of data below a threshold size; and
communicate data with at least one of an Application Function (AF) or a Data Network (DN), wherein the data is communicated with a User Plane Function (UPF) for transport with a low overhead as a Radio Resource Control (RRC) payload without initiating the bearer set up protocol.

28. The apparatus of claim 27, wherein the at least one processor is further configured to:
receive the data from the AF or the DN based on the RRC payload received from a Radio Access Network (RAN).

29. The apparatus of claim 27, wherein the at least one processor is further configured to:
transmit the data to the UPF as the RRC payload for transport to the AF or the DN.

* * * * *